Oct. 30, 1962 J. TERZIAN 3,061,192
DATA PROCESSING SYSTEM
Filed Aug. 18, 1958 12 Sheets-Sheet 2
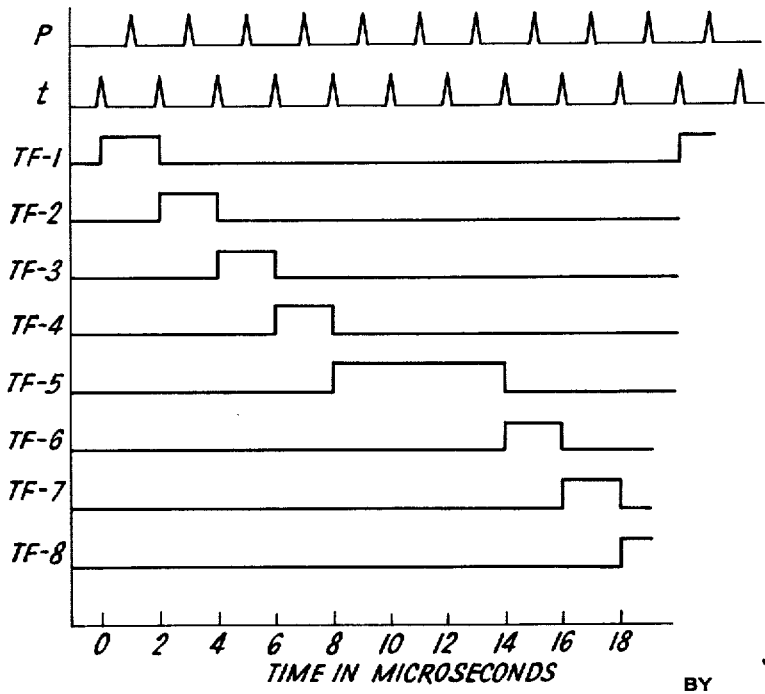

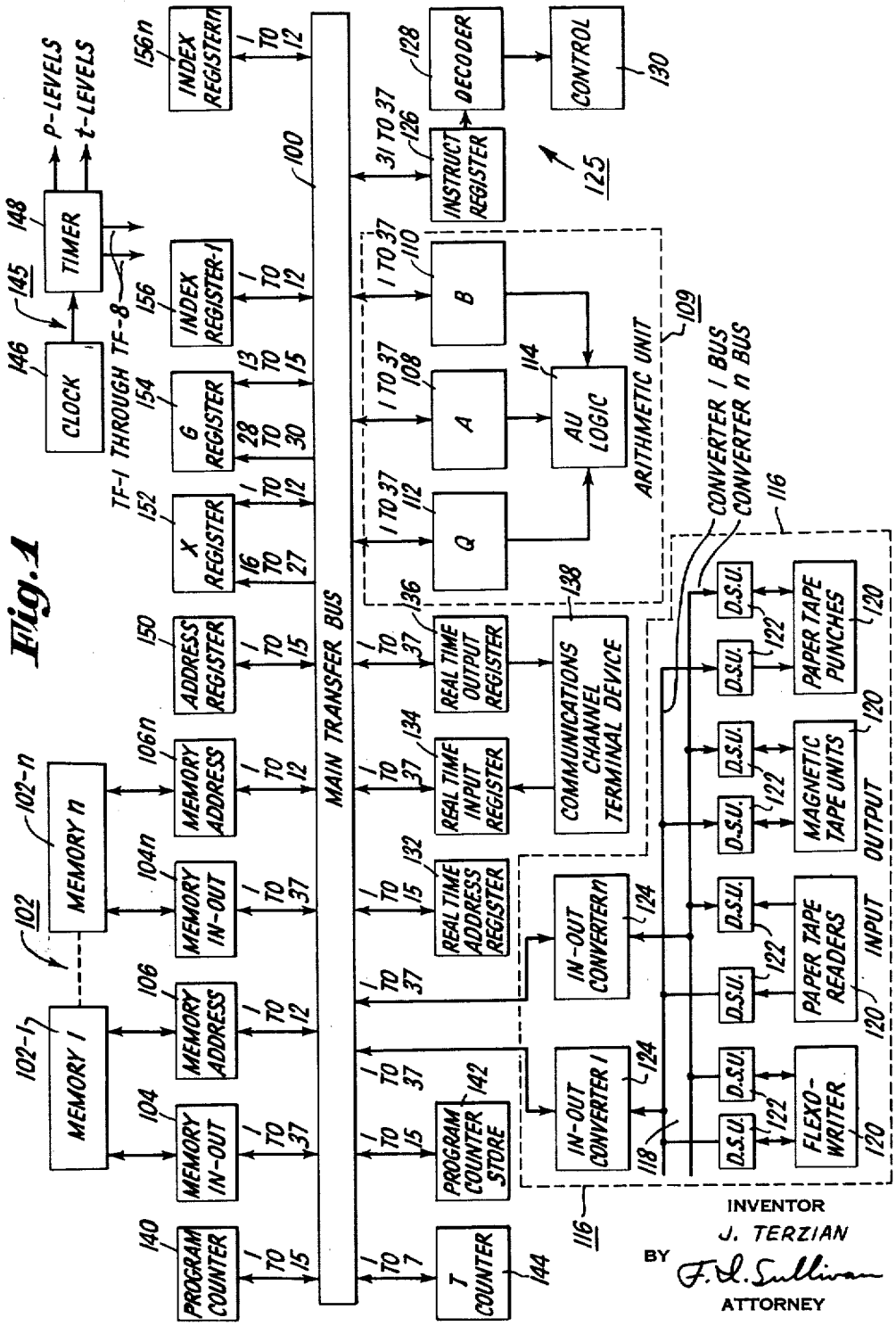

Oct. 30, 1962  J. TERZIAN  3,061,192
DATA PROCESSING SYSTEM
Filed Aug. 18, 1958  12 Sheets-Sheet 3

INVENTOR
*J. TERZIAN*
BY *F. D. Sullivan*
ATTORNEY

United States Patent Office 3,061,192
Patented Oct. 30, 1962

---

3,061,192
DATA PROCESSING SYSTEM
John Terzian, Woburn, Mass., assignor, by mesne assignments, to Sylvania Electric Products Inc., Wilmington, Del., a corporation of Delaware
Filed Aug. 18, 1958, Ser. No. 755,565
12 Claims. (Cl. 235—157)

This invention is concerned with data processing equipment and particularly with an improved design for an electronic computer.

The areas in which electronic data processing equipment and computers have utility may be broadly classified as: scientific computation; record keeping; and, real time applications such as industrial process control. For many potential proprietors of such equipment, the required investment, not only in purchase dollars, but also in items such as training of operating and servicing personnel, conversion of business and manufacturing methods, etc., is economically feasible only if a single computer can be used in all of these categories as a central processor working a variety of input and output devices, and handling its workload automatically on a controllable priority basis.

Hitherto, computers have, for the most part, been designed for special purpose applications, or to handle a single family of analogous problems within one of the broad fields or categories referred to above. There have been attempts, with a certain amount of success, to increase the range of capabilities of some equipments by resorting to ingenious programming. Such an approach, however, is wasteful and unsatisfactory because the equipment spends a disproportionate amount of valuable operating time processing and deciphering its own instructions. Moreover, existing equipments are hindered for true general purpose applicability because of factors such as inflexibility of input and output media, and the use of their arithmetic units for processing data into and out of the system in a manner which unduly prolongs and complicates their programs. Most existing computers, also, are forced to interrupt their programs periodically to determine whether input or output data is waiting to be processed. Such interruptions must be very frequent (e.g. milli- or micro-second frequencies) for any kind of significant real time application and waste a considerable portion of operating time.

Accordingly, a primary objective of the present invention is to provide a truly general purpose computer which can handle problems within all three of the broad categories of computation, record keeping, and real time response, and which is designed to act as a central processor handling concurrent work assignments in all of these fields on a controllable priority basis with a minimum of programming.

Another objective is to provide a computer in which access to storage is independent of the arithmetic unit, and one which is flexible as fas as both the nature and the number of input and output devices are concerned and expandable so that additional storage, input-output devices, etc. can be added as desired.

A further objective is to provide an improved computer system control whereby input-output and real time devices dictate their own access to the internal machine instead of relying upon program interruption for interrogation purposes. Still another objective is to provide an improved data processing system.

These and related objectives are accomplished in one embodiment of the invention by a computer which features: a main transfer bus comprising a separate conductor for each digit of the data word, and to which all of the component equipments are connected for data transfer purposes; a system of input-output devices and real time response which control their own access to the central machine; a storage system (comprising a memory and a plurality of directly addressable internal registers); a calculating or logical processing unit; and, a control network.

The input-output devices include such storage, display, etc. equipment as tapes, drums, card translators, on-line printers, etc. All of the internal registers are directly addressable as locations in memory, and computation can proceed independently while input-output and real time devices are working directly into and out of the memory and internal registers under direction of a unique combination of control bit signals and priority circuits. In the operation of the control system, instruction and execution of program instructions overlap within the basic operating cycle to provide economy of computer operating time.

Another feature of the design is that programs are interruptable on a priority basis, or as otherwise required, by the "control bit" signals to save program time otherwise wasted in necessary, but most frequently, fruitless, interrogation for priority, real time, or routine input or output requirements. As an adjunct of this latter capability, the timing system has been made expandable to accommodate a prolonging of the period allotted to given steps in the operating cycle as required. This saves the time otherwise lost in cycling through unproductive portions of the basic cycle to complete an unusually long operation involving only one step thereof.

Other objectives and features of the invention will be apparent from the following description and reference to the accompanying drawings, in which:

FIG. 1 is a block diagram of a computer system embodying the invention;

FIG. 2 is a diagrammatic representation of the data word processed in the computer of FIG. 1;

FIG. 3 is a diagram of the timing pulses of the computer of FIG. 1;

Figure 4:
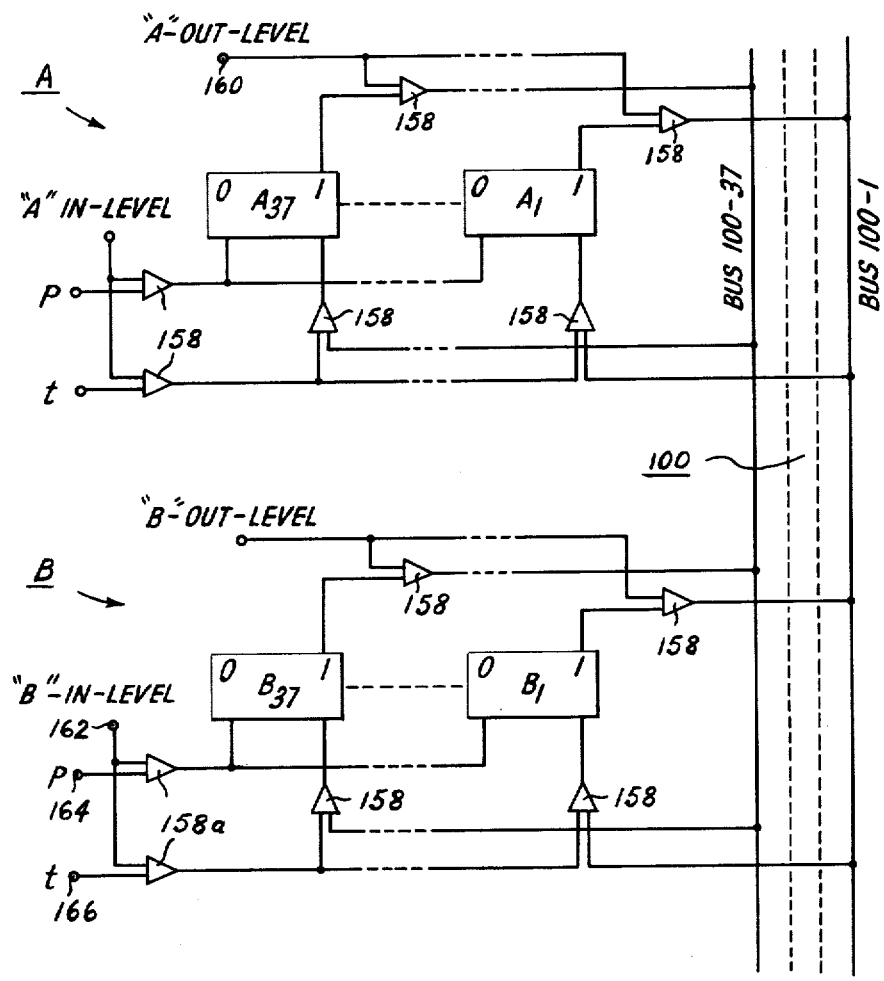
FIG. 4 is a diagrammatic representation of a representative portion of the pulse transfer mechanism of the computer.

The computer diagrammed in FIG. 1 is a high speed digital equipment adapted to process data in the form of a binary word such as the thirty-eight digit example shown in FIG. 2.

All of the components of this computer are connected to a Main Transfer Bus 100 which comprises a separate conductor for each one of the thirty-seven information bits of the data word, the thirty-eighth being a parity digit which is not transmitted over the Main Bus. The principal components so connected include: a Memory System 102 having a plurality of Memory Units 102–1 etc., each of which is connected to the bus 100 via a Memory In-Out Buffer 104 and a Memory Address Register 106; an Arithmetic Unit 109 comprising an A Register 108, a B Register 110, a Q Register 112, and a Logic Control Unit 114; an Input-Output System 116 comprising an Input-Output Converter Bus 118, to which are connected a number of Input-Output Devices 120 via Device Switching Units (DSU) 122, with each separate line of the Converter Bus 118 connected to the Main Transfer Bus 100 via an In-Out Converter 124; a Control System 125, including an Instruction Register 126, a Decoder 128, and a Control Unit 130; a Real Time System, including a Real Time Address Register 132, an Input Register 134, an Output Register 136, and a Real Time Terminal Device 138 such as a communications channel terminal equipment; a Program Counter 140, and a Program Counter Store 142; a T Counter 144, which functions as part of the Control System 125; a Timing System 145, including a Clock 146 and a Timer 148; and, a plurality of Internal Registers such as an Address Register 150, an X Register 152, a G Register 154, and Index Registers 156.

GENERAL DESCRIPTION

The operation of the computing mechanism under description is principally concerned with the following functions:

(1) Transferring to memory an overall operation control program in the form of a sequence of specific instructions along with the data to be processed. These instructions and data are in the form of separate multi-bit data processing words and enter the central machine over the Main Transfer Bus 100, via the Input-Output and Real Time Systems. Each word is stored in a separate address in memory.

(2) Calling the program, an instruction at a time, from memory.

(3) Adjusting each instruction, as required, and transferring its operand from an individual address in the memory to the Arithmetic Unit.

(4) Decoding the instruction.

(5) Executing the instruction.

These functions are performed by the equipment, and in the manner explained below.

MORE DETAILED DESCRIPTION OF COMPONENTS AND OPERATIONS

Main Transfer Bus

The Main Transfer Bus 100 is comprised of thirty-seven conductors, one corresponding to each digit (except parity) of the Word Format thereby providing a common parallel connection amongst all the internal registers of the system. In order to prevent ringing and cross-talk each conductor comprises a coaxial cable. This bus system greatly facilitates flexibility and expandability of the machine since further components such as additional memories, index registers, display devices, etc. can be added with little or no modification to the central machine or other components. It also facilitates the ability to address all Internal Registers as if they were locations in memory.

Memory

*Memory Units.*—Each Memory System 102 may comprise a high speed magnetic Core Memory Unit 102–1 etc. having, for example, a total capacity of 4096 thirty-seven binary bit words plus a parity digit for each word. The computer is so organized that memory capacity can be expanded by increasing the number of Memory Systems 102 connected to the Main Transfer Bus 100. Copending U.S. patent applications Serial Nos. 679,967 of August 23, 1957, and 727,602 of April 10, 1958, may be consulted for detailed description of a suitable memory system and auxiliary memory registers.

*Auxiliary Memory Registers.*—When a read pulse is applied to a Memory System 102 from the Control System 125, the contents of the memory location specified by the Memory Address Register 106 are extracted from memory and transferred to the Memory In-Out Register 104 which acts as a buffer for data being written into or read out of its associated Memory Unit 102–1 etc. Conversely, when a write pulse is applied, the contents of the Memory In-Out Register 104 are transferred to storage in the memory location specified by the Memory Address Register 106. Both of these Memory System auxiliary registers may be conventional flip-flop multi-bit storage devices of the sort described in the patent applications referenced above and constructed to satisfy the functional requirements indicated below.

In the system under description, and working with the data word of FIG. 2, the Memory In-Out Register 104 may be a thirty-eight bit storage register connected in parralel as a buffer between the sense amplifier outputs of the Memory Units 102–1 etc. and the Main Transfer Bus 100 which, in turn, connects it to every other location in the computer. The thirty-eighth stage of this register is not connected to the Main Bus 100 but, instead, it is connected to all of the other thirty-seven stages to provide a parity digit. The following control lines are connected from the Control Center 125 to the Memory In-Out Register 104: clear, transfer out to bus, transfer in from bus, and, set from sense amplifiers (which comprise the output from the various memory locations). The operation of these lines is explained below under the headings Control System and Transfer Operation.

The Memory Address Register 106 may, in the present system, be a conventional twelve bit flip-flop register. It has, as described in the above-referenced patent applications, the ability to specify the address of any one of the internal addresses of the particular Memory Unit 102–1 etc., with which it is associated by proper setting of its component flip-flop stages. Each Memory Address Register 106 receives its input from the central computer Address Register 150, the Real Time Address Register 132, etc., via gated connection to the Main Transfer Bus 100, and its outputs energize the appropriate lines of a diode decoder to select the particular coordinate conductors of the memory matrix which define the address in memory into which data is to be written or from which it is to be read to the internal selection circuits of its associated Memory Unit 102–1 etc. Its connections to the Central Control System 125 include: clear; and transfer in from bus. The manner in which this register and its control connections operate will be explained, subsequently, in the course of describing a typical addition operation of the machine.

Arithmetic Unit

The Arithmetic Unit 109 is that section of the computer where the actual arithmetic and logical operations of the program are implemented.

*A Register.*—The A Register 108, or Accumulator, may be considered the main register of the Arithmetic Unit. Most of the arithmetic or logical operations that the computer performs involve either the existing contents of this register or quantities which are processed through it before they are operated upon. In the four basic arithmetic operations, Add, Subtract, Multiply and Divide, the A Register holds, respectively, the sum, difference, product, and remainder, resulting from the specific operation. At the beginning of the operations Add or Subtract, it holds the augend and minuend, respectively.

This A Register is basically a thirty-seven stage pulse shifting register of the accumulator type with appropriate control circuit connections to enable it to: clear; transfer in or out to Bus 100; add to its own contents the contents of the B Register 110 for the performance of various arithmetic operations; complement; shift left or right; etc. The manner in which these operations are performed will be explained below in the discussion of the Control System, Transfer Operation, and Execution of a Typical Instruction.

*B Register.*—The B Register 110 is basically a thirty-seven bit storage register for holding one of the operands of the arithmetic operations. In the four basic arithmetic processes it holds respectively the addend, subtrahend, multiplicand, and divisor. It also has associated control circuitry for performing: clear; complement; and, transfer in from, or out to, bus operations. For example, to perform subtraction, the B Register 110 complements the subtrahend and adds the result to the contents of the A Register 108. Its function in other arithmetic and logic operations will be discussed below under the heading Control System.

*Q Register.*—The Q Register 112, also known as the Multiplier-Quotient Register, is an auxiliary device of the Arithmetic Unit 109. It is a thirty-seven stage shift register which finds primary use in the multiplication and division operations. During these processes, it holds the multiplier, low order bits of a double-length product or dividend, and the quotient. It can also be joined with the A Register 108 for double-length shift and cycle operations by interconnecting its most significant stage to the least significant stage of the Q Register by means of conventional shift register interstage connections which are energized when required. Its control connections permit it to: clear; shift right or left; and transfer to or from bus.

*Arithmetic-Logic Unit.*—The Arithmetic-Logic, or Control, Unit 114 contains the circuitry such as the carry chain, etc. required to implement the arithmetic and logic operations that occur in the three principal registers (A, B, and Q) of the Arithmetic Unit 109. The manner in which this unit functions in the various arithmetic operations of the machine will be described below in the discussion of the Control System.

Program Counting

*Program Counter.*—The Program Counter 140 is a fifteen stage counter circuit that holds the address of the next instruction of the program to be extracted from memory. It is arranged to step automatically and sequentially through all of the memory locations in which the program which dictates the operations of the computer is stored. Its control connections include: clear; transfer to or from bus; and, count.

The first twelve bits of this fifteen bit counter are used to identify the specific addresses within a Memory Unit 102–1 etc. where the particular program instruction concerned is located. The remaining three bits specify which of the Memory Systems 102 is being addressed, and also activate an alarm if a non-existent memory address is transferred into the counter. The availability of three bits for designation of a Memory System 102 limits to eight the maximum number of memories workable with the particular equipment under description because a binary capability in three separate channels gives $2^3$, i.e. 8, different signal combinations with which to identify a memory.

*Program Counter Store.*—The Program Counter Store 142 is a fifteen bit register which provides temporary storage for the contents of the Program Counter 140 when control is transferred to a sub-routine program by an appropriate instruction and the Counter 140 is processing the addresses of the sub-routine. At the end of the sub-routine, another appropriate instruction returns control automatically to the main program by transferring the contents of the Program Counter Store 142 to the Counter 140. Its control connections include: clear; transfer in from bus; and transfer out to bus.

Word Format and Internal Registers

*Word Format.*—The data word processed by the computer is composed of thirty-eight binary bits. As shown in FIG. 2, these bits are grouped in accordance with four different formats depending upon whether the word is representing: Binary Data; Alpha-Numeric Data; Standard Instructions; or, In-Out Instructions.

*Binary Data.*—As shown in FIG. 2–A, Binary Data is represented using a fixed point magnitude and sign combination. The magnitude of a number is represented in binary code by bits one through thirty-six. The binary point is understood to be placed between bits thirty-six and thirty-seven, and the thirty-seventh bit represents the sign of the number, e.g. positive quantitites are represented by zero and negative by one. Bit number thirty-eight provides a parity check. This check is "odd" in the system under discussion.

*Alpha-Numeric Data.*—FIG. 2–B demonstrates that the format for Alpha-Numeric Data is the same as for binary data except that the sign bit is eliminated. A specialized code is employed wherein any alpha-numeric quantity may be expressed by an individual combination of six binary bits. Thus, bits one through thirty-six can be used to represent any combination of a six alpha-numeric characters. Although this computer functions as a binary machine, it is possible to perform logical operations, such as comparison, directly on alpha-numeric data in this word format without extra conversion to a numerical value.

*Standard Instructions.*—FIG. 2–C shows a Standard Instruction divided into: Alpha, Beta, and Gamma Addresses; an Operational Code; a Spare Bit (number thirty-seven); and, a Parity Check Bit (number thirty-eight).

The Alpha Address comprises bits one through fifteen. This specifies the address in memory in which the data to be used in the performance of an instruction is located. Of these fifteen bits, the first twelve identify a specific location in a Memory Unit 102–1 etc., and bits thirteen through fifteen specify which of the Memory Systems 1–*n* is to be used. Also, one of the possible combinations of bits thirteen through fifteen is used to indicate that one of the Internal Registers 150–156 is to be used to modify the instruction. The actual register concerned is specified by an individual combination of bits one through five.

Bits sixteen through twenty-seven comprise the Beta Address. This is used for several different purposes, depending upon the instruction being performed. In one application, it may be loaded into or added to the contents of an Index Register 156; or, either alone or in combination with the Gamma Bits it may provide a second address for some instructions.

Bits twenty-eight through thirty comprise the Gamma Address which is used primarily for indexing. This address specifies which, if any, of the Index Registers are to be used with the instructions. Also, as mentioned in the paragraph above, the Gamma Bits may be used in combination with the Beta Bits to form a second address for the instruction.

Bits thirty-one through thirty-six are referred to as the Operation Code and designate the operation which is to be performed by the computer upon the contents of the addresses specified by the alpha, beta, etc. bits.

*Input-Output Instructions.*—FIG. 2–D demonstrates that the Input-Output Instructions correspond to the Standard Instructions, with bits one through fifteen comprising an Alpha Address, bits thirty-one through thirty-six, the Operational Code, bit thirty-seven being a spare, and bit thirty-eight providing a parity check. The difference is that the Beta and Gamma Addresses have been replaced, respectively, by *j* and *k* subdivisions of the data word.

The *j* group, which may include bits sixteen through twenty-one, specifies the particular Input-Output Device 120 addressed. Each of these devices has a specific address, and sixty-three separate units can be handled by the six bit *j* address suggested.

The *k* portion of the word may comprise bits twenty-two through thirty. It is used to specify the number of words, blocks, cards, lines, etc. to be processed by the Input-Output Device 120.

*Address Register.*—The Address Register 150 is a fifteen bit storage register which is used to hold the alpha portion of an Instruction Word prior to its transfer to an appropriate Memory Address Register 106. Since the specific location in memory or the identity of an addressable register whose contents are to be processed by the operation specified in the instruction is determined by the alpha digits, they are placed in this register 150 as an intermediate step before the execution of the instruction so that the address specified may be modified for relative addressing etc. For this purpose, the contents of a specified index register may be added to the contents of the Address Register via the Main Transfer Bus 100 in the manner indicated in connection with the explanation of the Instruction Word 2–C above.

Address Register 150, in the computer under description, may comprise fifteen stages of bits or storage. The first twelve of these comprise a memory or storage register address. The remaining three are used to provide an alarm indication if the contents of Register 150 do not indicate an existent memory location or Internal Register.

The control connections to the Address Register 150 are: clear; transfer to and from bus; and, add from bus.

*X Register.*—The X Register is a twelve bit storage device which is used to hold the beta portion of an instruction. In the system and with the Word Format under description, its twelve bits are connected to bus lines 16–27. For instructions which use the beta bits as part of a second address, however, this register connects to bus lines 1–12 in order to be able to correspond to the alpha address portion of an Instruction Word at the proper time. The X Register therefore has connections to two sets of bus lines, 1–12 and 16–27.

The control connections to the X Register include: a clear line; and two sets of bus transfer controls, one for transferring to and from the lower set of bus lines (1–12) and another for transfer to and from the higher set of bus lines (16–27).

*G Register.*—The G Register is a three bit storage device which holds the Gamma Bits of an instruction. The output of the G Register is used to determine Index Register selection and, in some cases, as part of a second address. For this purpose, the G Register 154, like the X Register 152, must have connections to two sets of bus lines. It may normally be connected to bus lines 28, 29, and 30; but, for addressing purposes, it can also be connected to bus lines 13, 14, and 15.

Its control circuits are the same as those associated with the X Register 152, i.e.: clear; transfer to and from high bus (28–30); and, transfer to and from low bus (13–15).

*Index Registers.*—Each of the Index Registers 156 is a twelve bit counter available for use in relative address or tallying iterations in program loops. In addition to being addressable in standard fashion over the Main Transfer Bus 100, these registers may have their contents modified by instructions such as: load index; transfer on index; add beta; subtract beta; transfer and load PCS (Program Counter Store); and, repeat.

When the Index Registers 156 are used for relative addressing, the contents of the particular Index Register specified by the gamma portion of an instruction will be placed upon the Main Transfer Bus 100. The Address Register 150, then, senses this information and adds it to the alpha address to form the relative address. When used for tallying, the desired number of iterations is initially loaded into an Index Register 156. This number is periodically decreased under control of instructions such as: repeat; transfer on index; or, subtract beta, until the contents of the Index Register are equal to zero, at which time the iterative process being controlled is terminated.

The control connections to the Index Registers 156 are: clear; transfer out to bus; transfer in from bus; and, subtract one (i.e. count).

Control System

The Control System 125 directs and controls the operations of the computer in response to the dictates of the operating program. The principal components of this system are the Instruction Register 126, the Decoder 128, and the Control Circuits 130.

*Instruction Register.*—The Instruction Register 126 is a seven bit storage device used to hold the six bit Operation Code portion of an instruction prior to transfer of these instruction bits to the decoder register. The seventh position presently holds the spare bit, number thirty-seven, and may be used for future expansion of the code. The principal function of this register is to provide temporary storage so that the instructions may be sensed to enable certain preliminary actions to occur before the decoding of the instruction commences in the Decoder 128. This is particularly useful in the execution of input and output instructions, where the availability of an addressed device must be determined before the instruction is executed.

The control connections to the Instruction Register include: clear; and, transfer to and from bus. It also may have one or more control lines which enable special instructions to be fed directly into the register.

*Decoder.*—The Decoder 128 contains a seven bit register which holds the instruction (plus spare bit) currently being executed by the computer. This decoder register derives its input through direct connection to the Instruction Register 126, and its output is permanently connected to a decoder network. It has no connections to the main transfer bus. Its control lines include: transfer in from instruction register; and, clear-halt. Clearing this register is the equivalent of halting the computer, since a condition of all zeros in the register constitutes a halting instruction.

The decoder circuit network may be any conventional logic tree or other decoder system adapted to select one or more specific output lines for any given combination of the six inputs derived from the decoder register.

*Control Circuits.*—The Control Circuits 125 include the registers, circuits, etc., used in directing the acquisition, decoding, and execution of instructions, and in controlling and coordinating various other logical steps and operations required for proper functioning of the complete computer system. The logic of these circuits is implemented in a manner well known in the computer art in accordance with the laws of Boolean algebra, and employing minimization techniques.

*T Counter.*—The T Counter 144 is a seven stage counting circuit that operates as an adjunct of the Control System. It is used to control shifting operations in the Arithmetic Unit 109, and for other purposes, e.g. executing multiply and divide orders, etc., which require a counting type of control. It also serves as a timer when one of the Timing Functions (TF–1–8) is extended in a manner explained below under the heading, Timing. Its control connections include: clear; transfer to or from bus; and, add or subtract one, viz. to count up or down.

*Typical Control Operations.*—As explained previously, this is a synchronously operated parallel machine with all internal processing of data taking place over the Main Bus 100. Consequently, each machine operation calling for the transfer of data from one register to another involves a Transfer Out to Bus and a Transfer In From Bus. The manner in which these transfer operations are accomplished is explained below under the heading Transfer Operation and is demonstrated in FIG. 4. The function of the Control System in effecting a transfer is to provide the In and Out Levels for the AND gates which control the flow of data into or out of the respective selected registers at the proper time. Appropriate Transfer In and Transfer Out lines for this purpose are provided from the Control Decoder 128 to each of the registers connected to the Main Bus. (See "A" and "B" Out- and In-Level connections in FIG. 3.)

Clear is accomplished by the Control System decoding a Clear instruction to energize the Clear control line connected from the Decoder to the register concerned. Each of the registers with a Clear capability has conventional internal circuitry to energize the "0" side of each of its component stages when its Clear input line is pulsed.

Shift (Left or Right) is accomplished by the decoder energizing an appropriate control line to the register concerned. Each of the registers having these shift capabilities has conventional controllable links between its various stages adapted to transfer the data content of one to the other. It is to these links that the Shift control lines are connected.

Complement lines are similarly provided from the Decoder to each of the registers having this particular capability. Within the registers concerned this line is connected in a conventional manner to reverse the bistable condition of each register stage.

Add is executed by adding to the contents of one register (A) the contents of another register (B). This is accomplished in a conventional parallel operation with a three stage anticipated carry for time-saving purposes. This type of addition is explained in an article by A. Weinberger and J. L. Smith entitled "A One Megacycle Adder Using One Megacycle Circuitry" in the June 1956 issue of the IRE Transactions on Electronic Computers. Briefly, it consists of adding to the AU Logic 114 the necessary Boolean circuitry to cause the carry chain to anticipate by three stages the carry digits required for the stage-by-stage summation of the contents of the two registers concerned.

Subtract is executed conventionally by complementing the contents of the B Register and adding the result to the A Register.

Multiply is effected in a conventional manner by shifting the multiplicand (contained in the B Register) the number of times indicated by the multiplier (carried in the Q Register) and adding the result after each shift to the contents of the A Register until this register contains the final product. During multiplication the most significant stage of the Q Register is joined to the least significant stage of the A Register to handle the low order bits of a double-length product. Thus, the multiplier bits are shifted out of the low end of the Q Register as their respective operators are performed, and the capacity vacated is taken by a portion of the product.

Divide is performed according to basic principles as outlined in Richards, supra, pp. 166–172, and using the "non-restoring" technique described by J. H. Felker in an article entitled "Arithmetic Processes for Digital Computers" in Electronics, vol. 26, No. 3, pp. 150–155, March 1953. Initially, the most significant digits of the dividend are located in the A Register and act as a remainder. The divisor (contained in the B Register) is shifted to the left to coincide with these digits and is then subtracted from them. Successive subtractions are made until the proper quotient digit is found. The new remainder is always put into the A Register so that the divisor may be subtracted from it. The Q Register holds the quotient, and the low order bits of the dividend until they are required to be added on as low order bits of the remainder. This is necessary when the number of bits in the divisor exceeds the number in the remainder and corresponds to "bringing-down" in manual division.

Read is accomplished by energizing the "Read" line from the Control System to the Memory Unit concerned. This line is connected as one input to each of the AND gates which control the operation of the individual current drivers for each of the separate coordinate conductors of the memory matrix. The other input of each of these gates is connected to a decoder of the appropriate Memory Address Register 106.

Write is accomplished in a similar manner by energizing Write control lines from the Control System to the Memory concerned.

Both the Read and Write operations are explained in detail in the patent applications previously referenced. In this equipment the Read and Write cycles each have a four microsecond duration and the necessary Read and Write pulses to derive an instruction and an operand from memory and re-write them into memory are automatically generated in each basic cycle. The Read pulses start in TF–4 for obtaining the instruction and TF–8 for obtaining the operand and the memory core sense amplifiers are strobed during TF–5 and TF–1, respectively, for sensing the data content of the cores. The Write pulses for returning the instruction and operand to memory start in TF–6 and TF–2, respectively.

*Timing*

The basic components of the Timing Circuit are a Clock 146 and a Timer 148.

The Clock 146 may be comprised of a crystal controlled multivibrator providing a one megacycle square wave. In the Timer Circuit 148, this signal is converted to two 500 kc. square wave pulse trains designated p and t levels (FIG. 1) respectively. These p and t levels are phased 180° apart and distributed throughout the machine for synchronizing purposes. They are differentiated and converted to standard 0.1 microsecond p and t pulses, respectively (FIG. 3), by gated pulse generators located throughout the system within the racks and close to the circuits in which the pulses operate, thus preventing distortions, delays, mistimings, etc. due to transmission of clock and control pulses for lengthy and unequal distances throughout the system.

In addition to the p and t outputs, the Timer 148 provides eight additional outputs designated TF–1 through TF–8 in FIGS. 1 and 3. These outputs apply timed gating levels which are referred to as "Timing Functions" throughout the machine. As shown in FIG. 3, they identify the eight periods of a basic cycle which comprises the steps required by the computer for the execution of a single instruction in its program.

The leading and trailing edges of the timing functions are synchronized with the t levels from the Timer 148, and the duration of each function is normally 2 microseconds in the system being described. In computer operations requiring basic cycles that are longer than 16 microseconds, however, the normal sequencing of the Timer 148 is temporarily interrupted by a λ flip-flop in a manner which will be described below causing it to remain at one or another of the eight timing functions. In such cases, for example, multiplication and division, the selected Timing Function remains high until the prolonged execution is performed and normal sequencing is resumed. The stopping of the Timer does not, however, interrupt the generation of p and t sequencing pulses and they can be employed to permit the memory to work the Input-Output System etc. while computation is proceeding.

An example of an extended timing function is shown at TF–5 in FIG. 3. All sequencing of the Timer 148 to produce the Timing Functions TF–1 to TF–8 is controlled by a flip-flop located in the Control Section 130 and referred to as λ. Whenever the λ flip-flop is set to zero, the Timer is stepped every 2 microseconds by successive t pulses. When λ is set to one, however, the t pulses are blocked and sequencing of the Timing Function is interrupted until λ is reset to zero. The generation of the timing functions is accomplished in Timer 148 by a counter (refer. Richards, supra, pp. 194–198). A set λ flip-flop inhibits the input t pulse train from being counted, thus holding the active counting flip-flop at its high state. The states of λ are controlled by gated $t$ and $p$ pulses within the Control Section 125 of the computer.

Transfer Operation

From the block diagram of FIG. 1, it is apparent that all the major components of the computer system are connected to the Main Transfer Bus 100, over which all the information flow within the computer is processed. FIG. 4 illustrates how information is transferred between register locations over this bus. In the example shown, assume that information is to be transferred from Register A to Register B, each of these registers comprising flip-flops $A_{1-37}$ and $B_{1-37}$, respectively, with an appropriate system of AND gates 158 and voltage input and output terminals 160, 162, etc.

At the beginning of the period in which transfer is to occur, the A output voltage level at Terminal 160 and the B input voltage level at Terminal 162 are both raised. The individual transfer bus lines 1–37 will now be high or low depending upon the states of the corresponding stages of the A register connected to them. For example, if stages A-1 and A-37 are both representing a one, the voltage on both conductors 1 and 37 of the Main Transfer Bus 100 will be raised; and, if either or both stages represent a zero, a relatively low voltage will appear on their respective buses. After an appropriate period of time (e.g. 1 microsecond), with the appropriate In and Out AND gates 158 energized by the A output and B input pulses, a $p$ pulse is introduced through Terminal 164 into the system. This $p$ pulse is gated through the B register Input AND Gate 158a to combine with the pulse at the B Input Terminal 162 and thereby clear the B register, i.e. set every stage to zero. At the next time interval (e.g. 1 microsecond later), a $t$ pulse arrives via Terminal 166 and sets to the one state all of the stages of the B register that are connected to the Main Transfer Bus lines 1–37 which have a high signal from the respective stages of the A register to which they are connected. The B register now contains the same data as the original contents of the A register, and transfer is complete. The voltage signals at the A Output Terminal 160 and the B Input Terminal 162 are thereupon lowered, causing both the A register and the B register to disconnect from the bus 100.

Input-Output System

The input-output system of this computer is characterized by exceptional versatility and expandability, along with the faculty of controlling its own access to and from memory, as required, without the necessity of repetitive program instructions of an interrogatory nature. It also is capable of direct access to and from memory over the Main Transfer Bus 100 independently of the Arithmetic Unit 109, with the result that this Unit can proceed with computation while the Input-Output System is working a Memory System 102 or Internal Registers 150–156.

As shown in the block diagram of FIG. 1, the principal components of the Input-Output System include: a number of In-Out Converters 124; an In-Out Converter Bus 118; and, a variety of Input-Output Devices 120 each connected to the Converter Bus 118 by means of a separate Device Switching Unit (DSU) 122.

This system is capable of simultaneous operation of as many Input-Output Devices 120 as it has Converters 124 connected between the Main Transfer Bus 100 and the Input-Output Converter Bus 118. The maximum number of converters that the machine is capable of handling depends upon the data rates of the Input-Output Devices 120 that are to operate simultaneously. In a typical system, as many as eight Converters may be employed to operate selectively with as many as sixty-three Devices 120.

Figure 5:
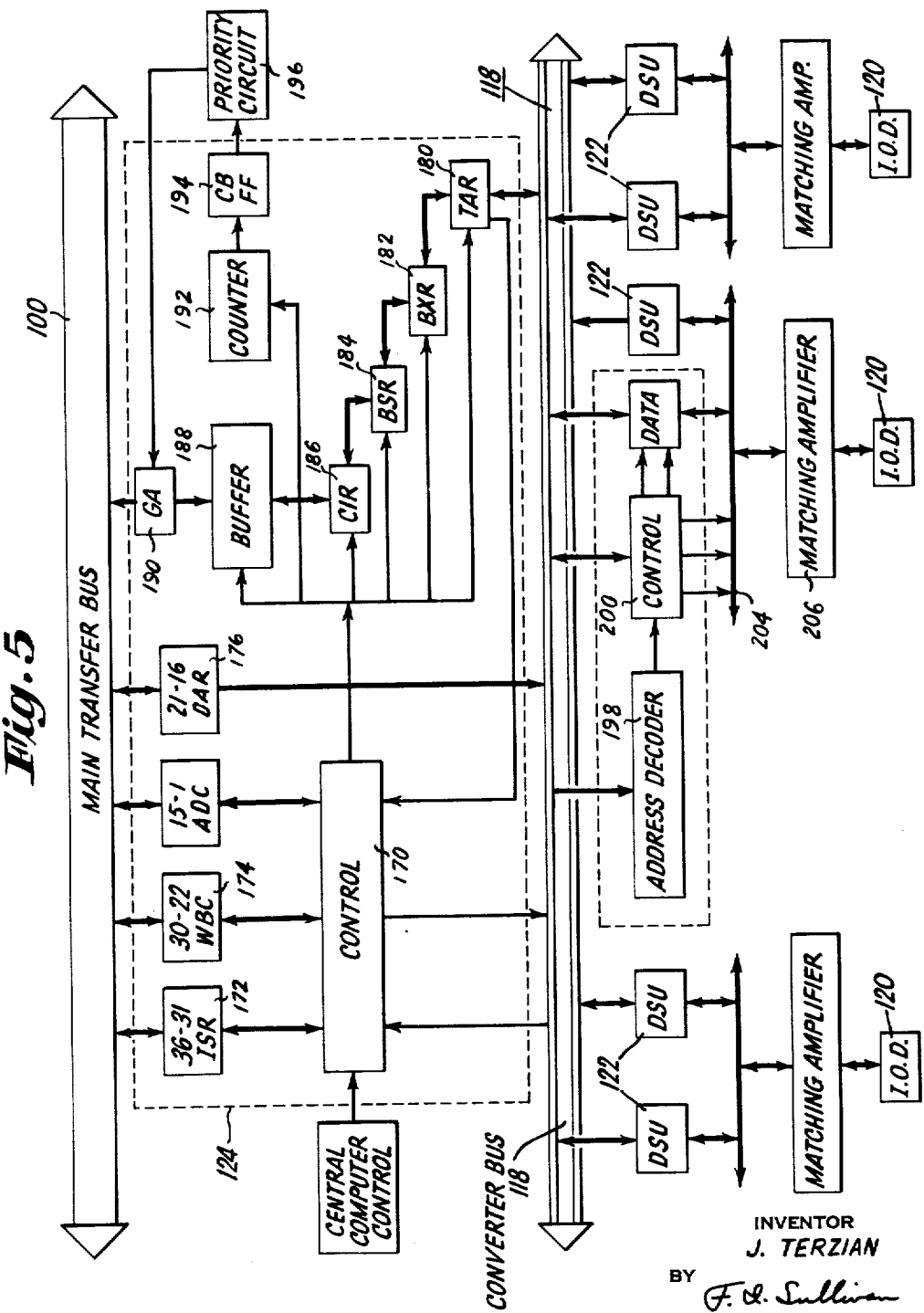
FIG. 5 is a block diagram of the input-output system of the computer.

FIG. 5 shows in more detail than the block diagram of FIG. 1 the components of the input-output system. The Converter 124 is subdivided into a Control Unit 170 and a plurality of Instruction Word Registers including: an Instruction Storage Register (ISR) 172; a Word Block Counter (WBC) 174; a Device Address Register (DAR) 176; an Address Counter (ADC) 178; Auxiliary Buffer Registers (TAR) 180, (BXR) 182, (BSR) 184, (CIR) 186; and a Major Buffer Register 188. The transfer of characters from the Buffer Register 188 to the Main Transfer Bus 100 is controlled by a Gate Circuit (GA) 190 which is responsive to signals processed through: a Counter 192; a Control Bit Flip-flop 194; and a Priority Circuit 196. Each of these Converter Systems is independently connectable to any selected Input Output Device 120 in a manner which will be explained below.

*Instruction Storage Register.*—The Instruction Storage Register (ISR) 172, in combination with the Word Block Counter 174, the Device Address Register 176, and the Address Counter 178, comprises storage for the thirty-six bit Input-Output Instruction Word processed from the central machine to the Converter 124. It is a six bit storage register connected to conductors 31–36 of the Main Transfer Bus 100. Its function is to hold the Operation Code portion of the Input-Output Instruction Word described with reference to FIG. 2–D. This register is addressable directly from the Main Transfer Bus 100 in conjunction with its associate registers listed above. Its control connections include: transfer in from bus; transfer out to bus; and, clear.

*Word Block Counter.*—The Word Block Counter (WBC) 174 is a nine stage subtracting counter which specifies the number of words or blocks to be handled during an input-output operation. This counter is connected to conductors 22–30 of the Main Transfer Bus 100 and is addressable in conjunction with its associated Instruction Word Registers 172, 176, and 178. Its control connections provide for: subtract one; transfer in from bus; transfer out to bus; and, clear.

*Device Address Register.*—The Device Address Register (DAR) 176 is a six stage storage register connected to conductors 16–21 of the Main Transfer Bus 100. It contains the address of the selected Input-Output Device 120, and provides outputs to the device address lines of the Converter Bus 118. This register is also addressable in conjunction with the other converter Instruction Word Registers 172, 174, and 178, but can be modified only at the time of input-output converter selection. Consequently, the nature of the instructions pertinent to the operation of a particular Device 120 can be altered while the device itself is operating, and the Device Address Register 176 will hold central machine connection to the particular device concerned during the modification.

*Address Counter Register.*—The Address Counter Register (ADC) 178 specifies the address of a memory location or a register into which each word of a sequence is stored during an input instruction, or from which a word is taken during an output instruction. It comprises a fifteen bit counter, which at the start of an Input-Output Instruction receives the address of the first memory location whence data is to be derived or into which it is to be stored. After each memory access its contents is augmented by one to provide a new working address.

This register is connected to conductors 1–15 of the Main Transfer Bus 100 and is addressable in conjunction with its associated Converter Instruction Word Registers 172–176. Its control connections include: transfer in from bus; transfer out to bus; clear; and, add one.

*Auxiliary Buffer Registers.*—The four Auxiliary Buffer Registers 180–186 are employed for the transfer of data from the Converter Bus 118 to the Main Buffer Register 188. These are six bit storage registers which are adapted to process alpha-numeric data a character at a time in accordance with the six digit binary coded word format explained with reference to FIG. 2–B above.

The TAR Register 180 which is proximate the Converter Bus 118, performs, through the medium of a control flip-flop, an auto-synchronizing function upon the asynchronous data coming off the bus 118. It also has connection with the Converter Control Unit 170 for sensing of special symbol digits such as block marks, etc. and for performing parity checks. The Intermediate Buffers BXR 182 and BSR 184 provide a delay for input data so that the machine may be capable of accommodating a plurality of Converters 124. The CIR Register 186 is similar to the TAR Register 180 in that it provides for sensing of special symbols and a parity check in addition to contributing to storage delay of data flowing from a Device 120 to the central machine. Such delay is required to accommodate simultaneous operation of two or more Devices.

The control connections for each of the Registers 180–186 include: transfer in; transfer out; and, clear.

*Main Buffer Register.*—The Main Converter Buffer 188 is a thirty-seven stage shift register which processes data to and from the CIR Register 186, six digits at a time, i.e. one complete alpha-numeric character of the code explained above under the heading Word Format, with reference to FIG. 2–B. It also shifts in six stage units so that six shifting operations introducing data from the Auxiliary Six Stage Buffer (CIR) 186 results in filling the thirty-six stages of the Buffer 188 with a complete word suitable for parallel transfer to the central machine over Main Transfer Bus 100. The thirty-seventh digit of Register 188 provides for a parity check. Buffer 188 is connected to the Main Transfer Bus 100 but is not directly addressable, due to its dependence upon Gate 190 to complete the connection. Its control connections include: transfer in from bus; transfer out to bus; transfer digits in from CIR; transfer digits out to CIR; and, clear.

*Auto-generated Control of Data Transfer between Buffer and Central Machine.*—As mentioned previously in this description, a unique feature of this computer is the manner in which input data is processed into the central machine. The components which cooperate to accomplish this are the Converter Main Buffer 188 and associated Counter 192, Control Bit Flip-flop 194, Priority Circuit 196, and Gating Circuit 190. As explained above, the Auxiliary Buffer Registers 180–186 which are associated with the Buffer 188 accept the asynchronous data coming from an Input-Output Device 120 over the Converter Bus 118 six digits at a time, store it, and synchronize its flow. They also process this data, still six digits at a time, into the Buffer 188. After six transfers have been made from the CIR Register 186 to the Buffer 188 a complete thirty-six digit word has been assembled in the buffer for transfer over the Main Bus 100. The Counter Circuit 192, which is set to zero each time the Buffer 188 is cleared in preparation for the acceptance of a word, is pulsed each time a six bit transfer is made from the CIR Register 186 to the Buffer 188. After the sixth transfer the Counter 192 sets the Control Bit Flip-flop 194 which signals to the Priority Circuit 196 that the buffer associated with this particular control bit is ready for transfer of data to the central machine.

Priority Circuit 196 is connected to the Gate 190 which controls the flow of data between Buffer 188 and the Main Transfer Bus 100. It also has a similar input connection from each of the other Converters 124 in the system and the Real Time Input Registers 134, and is constantly cycling through a sensing each of these inputs. When any of them indicates that input or other data is ready for transfer into the central machine, the Priority Circuit signals the Central Control 130 to stop the operation of the central machine upon completion of the current instruction so that the data may be accepted. This is accomplished by the central control sensing a signal connection to the Priority Circuit as an ancillary step of its basic cycle. The Central Control 130 also automatically surrenders control to the Priority Circuit for transfer of input-output data over the Main Bus 100 during the execution of relatively lengthy operations, such as multiply and divide, by the Arithmetic Unit 109.

Once the Priority Circuit 196 takes over control, it cycles through its input connections on a priority basis to transfer data from the various Converter Buffers 188 and Real Time Input Registers 134 to memory locations and addressable Internal Registers of the central machine. The sequence in which the priority circuit works its satellite input-output devices is determined by an assigned cycle which is established by the permanent wiring of the control system of the machine.

*Converter Bus System.*—The Converter Bus 118 connects each Converter 124 with all of the Input-Output Devices 120 in the system. In the particular system under description, the bus 118 consists of a separate combination of twenty-two line conductors for each of the converters used. Six of these lines (17–22) are used for selective addressing of Input-Output Devices 120. Eight lines (9–16) are used for data transfer; and eight lines (1–8), are used for control purposes. The functioning of this bus will be apparent from the detailed description below of the operation of the Converters 124 and the Device Switching Units 122.

*Device Switching Units.*—A separate Device Switching Unit 122 controls the flow of information between each Converter 124 and each Input-Output Device 120. Consequently, each Device 120 must have as many Switching Units 122 as there are Converters 124 employed in the system.

In FIG. 5, one of the Switching Units 122 has been represented by a block diagram of its major components. These include: an Address Decoder 198; a Control Switch 200; and a Data Switch 202. They are connected to a Device 120 via a Device Bus 204 and a Matching Amplifier 206. Each bus 204 has as many Switching Units 122 connected to it as there are converters in the system.

The operation of the Device Switching Units 122 is logically divided into three functions. These are:

(1) The decoding of the address appearing on the Converter Bus lines and the generation of a gating signal which connects the selected Device 120 to the requesting Converter 124.

(2) The gating of appropriate control information between the Device 120 and the Converter 124. This information includes starting signals to the device and synchronizing signals to the converter.

(3) The gating of data flow between the Converter 124 and the selected Device 120.

The function of addressing a particular Device 120 is accomplished by sending the proper combination of pulses over the six line input to its Address Decoder 198 to provide an activation signal from the decoder to the Control Switch 200. Upon the receipt of such a signal, the Control Switch establishes connection between lines 9–16 of the particular Converter Bus 118 which has addressed its Device 120 and the Transfer Bus 204 of this device. The Control Switch 200, also, indicates to the Data Switch 202 whether the Device 120 addressed is to perform an input or output operation. This Data Switch is comprised of eight channels connecting the Input-Output Device 120 to conductors 1–8 of the Converter Bus 118. These channels are capable of data flow in either direction, depending upon whether they have received an input or output control signal from the Switch 200.

The Matching Amplifier 204 amplifies the signals passing to and from the Device 120 and matches the impedance of the device to that of the Switching Unit 122.

*Operation of the Input-Output System.*—The operation of the Input-Output System is best illustrated by describing in sequence the events that take place in the performance of an Input-Output Instruction.

*Input.*—When an Input Instruction is read out of memory it is initially transferred to the Instruction Word Register 126 of the central machine and the Internal Registers 150–156. A test is then made to determine the state of the particular Input-Output Device 120 addressed by the instruction. If that device is in use, computation is halted by λ being set to one, in the manner explained under Timing above, to hold the machine at the particular Timing Function TF-1-8 at which it is currently operating until the device is released. When the device is ready, a Converter 124 is selected and the Input-Output Order along with some control information is transferred to that converter.

The selection of a converter is automatic and is governed by an iterative circuit, located in the Control System 130, which senses the converters in a fixed sequence and selects the first one which is free. If all converters are busy, the operation of the basic cycle is held up again by setting λ to one in a manner similar to that explained immediately above for the situation when a particularly addressed Input-Output Device is unavailable.

The thirty-six bit Instruction Word, when it is transferred to a Converter 124, is stored in the following registers:

Digits 1–15 are transferred to the Address Counter Register (ADC) 178;

Digits 16–21, to the Device Address Register (DAR) 176;

Digits 22–30, to the Word Block Counter (WBC) 174; and

Digits 31–36, to the Converter Instruction Storage Register (ISR) 172.

The control information, which is processed by bits 31–36 through the ISR Register 172 to the Converter Control System 170, operates through a combination of sensing and control flip-flops and their associated circuitry to determine whether the order received is compatible with the type of Input-Output Device 120 which has been addressed. It also provides for auxiliary features such as: interpreting sign; determining whether the computer is to halt upon the incidence of input errors or ignore them; determine whether the Device 120 addressed is an input device or an output device; determine whether the Device 120 addressed is a magnetic tape; etc.

If the order received is compatible with the type of input-output device addressed, the converter initiates execution of the input-output instruction. If it is not compatible, the computer is halted.

The first step in the execution of the order is the selection of the Input-Output Device 120. To accomplish this, the Device Address Register (DAR) 176 drives the six converter bus lines connected to the Address Decoders 198 of all the Device Switching Units 122 with the particular combination of pulses which comprise the address of the desired Device 120. The Decoder associated with the addressed device thereupon provides a gating level which initiates through its Control Switch 200, as explained above under the heading Device Switching Units, the transfer of the appropriate control information between the Converter and the Device. At this point, control of the actual data transfer is taken over by synchronizing signals generated from the data itself in the TAR Auxiliary Buffer, in the manner explained above. During an Input Instruction, the direction of the flow of data, i.e. character transfer from the Input-Output Device 120 to the Converter 124, is as follows: through Data Switch 202 in Device Switching Unit 122; over conductors 1–8 in the Converter Bus 118 through the TAR 180, BXR 182, BSR 184, and CIR 186 Registers in sequence. After the character is transferred into the CIR Register, it may be checked for parity. It may also be sensed for special control symbols and checked for parity in the TAR Register 180.

Now, under Converter control, the six data bits are transferred from the CIR Register 186 to the six low-order positions of the Buffer Register 188. This register is then shifted six digits to accommodate the next character. When a complete word is assembled in the thirty-seven bit Buffer Register by six input shifting operations, the Control Bit Flip-flop 194 is set by the Counter 192 in the manner previously described and Priority Circuit 196 provides for the Gate 190 to connect Buffer 188 with the Main Transfer Bus 100 and thereby gives it access to a location in memory, or one of the Internal Registers addressable from the Main Bus 100.

The particular location to which the word assembled in Buffer 188 is transferred is designated by the contents of the Address Counter (ADC) 178. The original Input Instruction provided the address of the location in memory in which the first complete word resulting from the instruction was to be stored. This address, designated by the first fifteen bits of the Instruction Word, was transferred into the Address Counter. After each transfer of a word from Buffer 188 to memory the contents of this counter is augmented by one to provide the address for the next word.

*Output.*—At the initiation of an output instruction, the Control Bit Flip-flop 194 is set to the proper condition to cause the Priority Circuit 196 to enable Gate 190 to connect Buffer 188 to the Main Transfer Bus 100 when the buffer is cleared and in condition to accept a word from the central machine. After the output word is transferred into Buffer 188, the six high-order digits are re-transferred to the CIR Register 186 which makes a parity check on this particularly character. Then, in response to synchronizing signals from the output device, the contents of the CIR Register 186 is transferred through the BSR 184 and BXR 182 Auxiliary Buffer Registers to the TAR Register 180, and over the Converter Bus 118 to the particular Device 120 concerned.

This six digit at a time shifting process is repeated until the Buffer Register 188 is emptied. Whereupon, the Counter 192 will have reset the Control Bit Flip-flop 194 so that the Priority Circuit 196 and Gate 190 can provide for another word to be transferred into the Buffer Register 188 and processed to the Output Device 120. It is to be understood that, after transfer of a word into Register 188, Gate 190 is closed until reopened by this counting of the number of shift pulses required to empty the register.

As explained above, the actual input and output processing of data and access to memory are independent of the operation of the Arithmetic Unit 109, and asynchronous with the rest of the machine until the Control Bit Flip-flop 194 initiates a transfer to memory. Normally, the Control Bit is sensed once every basic cycle. On long instructions, however, such as multiply and divide, shifting etc., it is sensed more frequently.

*Real Time System*

The real time input-output system of the computer provides for immediate response to and control of external operations, interrogations, etc. It serves as a temporary buffer for asynchronous external data and permits it to be fed into the computer system automatically as soon as it is generated. It also provides output indications in the form of control signals, displays, etc. in immediate response to variable conditions.

Figure 6:
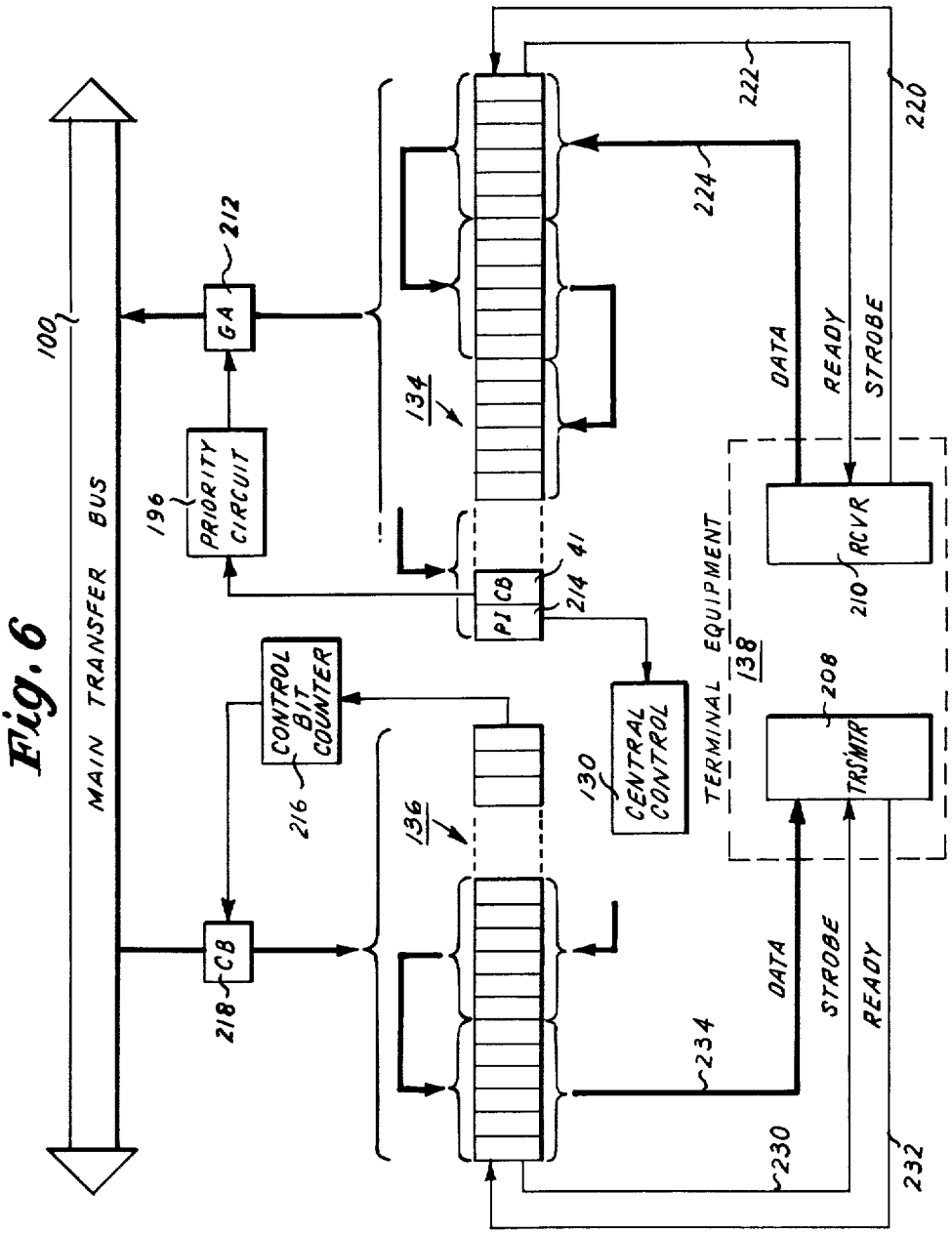
FIG. 6 is a block diagram of its real time system.

FIG. 6 shows a block diagram of the input and output components of the Real Time System. These include: a Real Time Input Register 134, a Real Time Output Register 136, and Terminal Equipment 138 such as the Transmitter 208 and the Receiver 210 of a communications channel. The Input Register 134 is connected to the Main Transfer Bus 100 through a Gate 212 under control of the Priority Circuit 196 which has been described above with reference to the Converter System. It is also connected through a Program Interrupt Circuit 214, associated with the final stage of the Register 134, to the Central Control 130 of the entire computer system. This permits real time interruption of the normal input cycle of the computer to introduce an input signal of the proper priority. The Output Register 136 is connected through a Control Bit Counter 126 to a Gate 218 which controls the flow of data from the Main Transfer Bus 100 to the register.

*Input.*—Upon receipt of an appropriate signal at the Receiver 210, the real time input system functions as follows to process data into the central machine via the Main Transfer Bus 100. Data arriving at the Receiver 210 generates a strobe pulse over Line 220 to the Input Register 134. When this register is clear to receive data, a responding ready pulse is transmitted back to the Receiver 210 over Line 222. Upon receipt of this ready signal, the receiver transmits to the Register 134 its data in the form of successive six bit frames.

These frames are shifted six stages at a time through the forty-two stage Register 134 until it has been completely loaded. The first frame of any sequence includes instruction digits for the data which is to follow. One of these digits is known as the program interrupt instruction and the other as the control bit. The control bit will always be an affirmative signal. When it has been shifted to its final stage, e.g. the forty-first in the forty-two bit Register 134, an appropriate connection 226 to the Priority Circuit which controls Gate 212 causes the data in the first thirty-six stages of the register to be transferred to conductors 1-36 of the Main Transfer Bus 100, automatically, upon completion of the current instruction. This happens in the same manner as explained above with reference to Gate 190 in the Converter System.

The location within the central machine to which data may be thus transferred is determined by the contents of the Real Time Address Register 132 (see block diagram, FIG. 1). The contents of this register are originally set by the Real Time Input Instruction and automatically indexed after each access to memory from the Real Time Input Register to allocate subsequent addresses without waste of programming time. They are not indexed if the access is to one of the addressable Internal Registers 150-156 instead of an address in one of the Memory Units 102-1 etc.

*Program Interrupt.*—If the proper signal is inserted by the incoming data in the program interrupt position, e.g. a one in digit #6 of the first six processed into Register 134, the arrival of this signal after the seventh shift at stage 42 will transmit an indication over the Conductor 228 to the Central Control 130 of the entire computer system (as shown in FIG. 6), and thus interrupt the main program to process the priority data indicated. This interruption takes place immediately upon completion of the current instruction or during the computation period of longer instructions, e.g. multiply and divide, and takes precedence over other input indications to the Priority Circuit 196. Also, if the instruction it introduces so indicates, it may immediately initiate a new program.

*Output.*—When a program instruction indicates that data is to be transferred out of the central machine through the real time output system, a Control Bit Flip-flop 218 is sensed by the Central Control 130 to determine whether the Ouput Register 136 is clear to receive data. When the Register 136 is clear, data is processed into this register from the Main Transfer Bus 100 a full word at a time. When the Register 136 is thus loaded it sends a strobe pulse over Line 230 to the Transmitter 208 of the Terminal Equipment 138. If the transmitter is ready to handle the data, a ready signal is returned over Line 232. Upon receipt of such a signal the Register 136 shifts its data out, six digits at a time over the six Channel Data Link 234, to the Transmitter 208. The Control Bit Counter 216 is pulsed for each shift of the Register 136; and, after the sixth pulse is received, it indicates by resetting the Control Bit Flip-flop 218 that the Register 136 is ready to accept more data.

In this manner the real time input-output system is capable of direct response to and control of external devices and operations. It directs the transmission and reception of data to or from remote locations where on-line controls may be monitored and effected, interrogations may be initiated, etc. Also, it is possible to connect two computer systems of the type described back to back by cross linking their respective Receiver 210 and Transmitter 208 units, so that one computer may communicate with another at either local or remote locations.

BASIC CYCLE AND OVERLAP OF INSTRUCTIONS

Since this is a synchronous machine, its operation in performing the instructions of a program may be best described and understood by reference to a basic cycle. For purposes of the present description, this basic cycle is subdivided into eight steps or periods corresponding to the Timing Functions TF-1-8 produced by the Timer 148 and described above under the title Timing. Each period is normally 2 microseconds in duration, providing a basic cycle duration of 16 microseconds. For instructions that require a longer period of time, e.g. multiplication, division, etc., any of the eight timing functions can be extended in the manner described with reference to the $\lambda$ flip-flop under the heading Timing above. This extends the Timing Function concerned until the operation is completed.

The operations that occur during a basic cycle can be separated into two classes. The first class consists of those which occur specifically for execution of the particular instruction being performed. The second class of operations, referred to as basic cycle operations, is common to all instructions. It includes the instruction and operand accesses to memory and a group of additional control functions required for proper sequencing of the computer through its basic cycle.

A special feature of the machine under description is that these two classes of operations are overlapped in time, i.e. carried on simultaneously, through a specialized use of the Instruction Register 126 with a resulting economy of operational time. The following description will explain how Register 126 provides storage for the instruction word immediately after it has been extracted from memory thereby making it possible for both the instruction and operand accesses to memory of the current instruction to take place, while the previous instruction is being executed.

The sequence of events involved in the selection and execution of a typical instruction is as follows:

The contents of the Program Counter 140 are transferred via the Main Transfer Bus 100, to a Memory Address Register 106.

The instruction specified by the particular address is extracted from memory and sent in respective portions to the Address Register 150, the X Register 152, the G Register 154, and the Instruction Register 126. This step comprises the instruction access to memory.

The contents of one of the four Index Registers, if this step is specified in the instruction, are then added to the address portion of the contents of the Address Register 150.

The address thus modified is sent back to the specified Memory Address Register 106 to initiate the operand access to memory.

The operand is extracted from the specified address in memory and placed in the memory In-Out Register 104. Then, the operational code of the instruction is transferred from the Instruction Register 126 to the Decoder 128 to initiate execution of the Instruction.

While execution of this instruction proceeds, the next instruction and operand accesses to memory occur in the manner just described to commence performance of the next program order.

The preceding sequence of events may be related to the timing functions of the basic cycle in the following manner:

(It will be assumed that while a present instruction is being processed by this basic cycle, commencing at TF-4, an addition operation called for by the preceding instruction is being executed.)

*TF–1.*—The operand of the preceding instruction arrives at the Memory Output Register 104.

*TF–2.*—This operand is rewritten into the memory address from which it was extracted and simultaneously transferred from the Memory Output Register 106 to the B Register 110 of the Arithmetic Unit.

*TF–3.*—If the signs of the contents of the A and B Registers in the Arithmetic Unit are alike, the contents of B are added to the contents of A. If their signs are different, the ones complement of B is formed, and $B+1\times 2^{-36}$ is added to A.

*TF–4.*—The contents of the Program Counter (identifying the present instruction) are transferred to the Memory Address Register 106 and a read pulse is transmitted to the Memory System 102. Simultaneously, to further execute the addition of the preceding instruction, if B was complemented and there was no overflow, the ones complement of the contents of Register A is formed and its sign reversed. If the contents of B were not complemented and there was an overflow, the overflow alarm flip-flop is set.

*TF–5.*—The present instruction arrives at the Memory Output Register 104 from the address in memory specified by the contents of the Program Counter 140. Simultaneously, to complete execution of the addition ordered by the previous instruction, if the contents of Register B complemented and there was no overflow $1\times 2^{-36}$ is added to the contents of Register A.

*TF–6.*—Appropriate portions of the contents of the Memory Output Register 104 are transferred to the Address Register 150, the X Register 152, the G Register 154, and the Instruction Register 126. Also, the instruction is rewritten into the Memory Output Register 104.

*TF–7.*—The Program Counter is stepped, and the contents of the particular Index Register 157 specified by the gamma address, if required by the instruction, are added to the Address Register 150.

*TF–8.*—The contents of the Address Register 150 are transferred to the Memory Address Register 106, a read pulse is transmitted to the Memory System 102, and the contents of the Instruction Register 126 are transferred to the Decoder 128. This puts the machine into condition to execute the instruction just processed and repeat the basic cycle as described above.

*Execution of a Typical Instruction*

An understanding of the structure and functional cooperation of the various units which comprise the complete system of FIG. 1 may be facilitated by a description of how the equipment performs one of its more simple operations, for example, execution of the instruction: Add the Contents of Memory Location *n* to the Contents of the Accumulator and Leave the Result in the Accumulator.

This operation will be described with reference to the timing diagram of FIG. 3 in a step by step sequence. As explained previously, the basic cycle of the machine involves eight steps or timing functions (TF–1 to TF–8). Each timing function has a two microsecond duration corresponding to the interval between *t* pulses and a *p* pulse occurs at its midpoint.

The machine in performing an operation is concerned with two basic functions. First, it derives from memory the instruction order, and second, it executes this order. To reduce the time of the operating cycle, the instruction of one order is processed while the preceding order is being executed. This has been explained in the preceding section wherein it was demonstrated that an order to be executed is first initiated at TF–4 of one cycle and then executed during the periods TF–1 to TF–5 of the following cycle.

The following is a detailed sequence of computer operations in executing the addition order set forth above. Assume that relative addressing is necessary.

TF–4

The fifteen binary bits in the Program Counter 140 which determine the address in memory of the next instruction are transferred over conductors 1–15 of the Main Transfer Bus 100 from the Program Counter 140 to the Memory Address Register 106 of the particular memory unit specified by the combination of binary bits transferred from the Counter 140 to conductors 13–15 of the Bus 100. This is accomplished in the manner explained in the preceding section for performing a Transfer Operation. To effect it the Control System 125 automatically cycles a Transfer-Out pulse to the Program Counter at this time as one of the routine micro-operations in its basic cycle.

A Read pulse is transmitted to the selected Memory 102. This is an automatic Read in the basic cycle to derive the instruction from memory and the particular Memory Read line selected in the Control System is determined by decoding the Program Counter bits 13–15.

TF–5

The contents of the specified address in selected Memory 102 are transferred in parallel from the thirty-eight separate digit positions of the Memory 102 to the thirty-eight stages of the Memory In-Out Register 104 when the sense amplifier outputs of the Memory cores are sensed. Boolean circuitry connected to this register performs an odd parity check of the first thirty-seven digits with the thirty-eighth, and if they do not satisfy the check, halts the computer.

TF–6

The contents of the first fifteen stages of the Memory In-Out Register 104 are transferred over conductors 1–15 of the Bus 100 to the Address Register 150, the contents of stages 16–27 are transferred over conductors 16–27 to the X Register, the contents of stages 28–30 are transferred over conductors 28–30 to the G Register, and the contents of stages 31–37 are transferred over conductors 31–37 to the Instruction Register 126. This causes the instruction about to be performed to be inserted in the Control Section and holds the address of the operand available for the next step.

The contents of the Memory In-Out Register 104 is written back into the memory location from which it had been extracted.

TF–7

The Program Counter 140 is stepped, by routinely programmed conventional counter techniques, to increase its count to the next instruction to be performed. The Index Register, specified by the bits in the G Register, transfers its relative address over Bus 100 to Address Register 150 where it is added to the address located therein.

TF–8

The contents of the Address Register 150 are transferred to the Memory Address Register 106.

A Read pulse is transmitted to the Memory.

The contents of the Instruction Register 126 are transferred to the Decoder 128 and the matrix of conductors which comprise the Control System 130 are energized in the manner dictated by the Decoder 128 input to this matrix.

TF–1

The contents of the memory address (*n*) specified by the contents of the Memory Address Register 106 are transferred from their location in the Memory 102 to the Memory Output Register 104 and an odd parity check of the contents of stages 1–37 is performed with the content of stage 38. This is the operand of the instruction to be executed in accordance with the set-up of Control System 130 as initiated by the transfer during TF–8 of the instruction portion of the word to the Decoder 128.

TF-2

The digits of the operand are rewritten from the Memory In-Out Register 104 into the address $n$ of the Memory 102, as specified by the contents of Memory Address Register 106.

The operand is also transferred over the Bus 100 from the Memory Output Register 104 to the B Register 110 because their respective Transfer in From and Out to Bus lines have been energized by the decoding of the instruction.

TF-3

If the signs (digit 37) of the words contained in the Accumulator 108 and the B Register 110 are identical, the contents of the B Register is added to the contents of the Accumulator. If the signs are different, a one's complement of the contents of the B Register is performed and the result plus $1 \times 2^{-36}$ (to provide a two's complement) is added to the contents of the Accumulator. The comparison of the signs $A_{37}$ and $B_{37}$ is performed by Boolean circuitry and the result is employed to set or reset a flip-flop in the Control System which will indicate for the operations of the next two timing functions whether B had been complemented and also serves as a carry into the least significant stage of the A Register to add $1 \times 2^{-36}$ when required.

TF-4

If the contents of the B Register was complemented and there was no overflow, the contents of the Accumulator is one's complemented and its sign reversed.

TF-5

If the contents of the B Register was not complemented, an overflow is present, and either the sixteenth or the seventeenth bit of the X Register is a Zero, the overflow alarm flip-flop is energized. Also, if the contents of the B Register was not complemented, an overflow is present and the sixteenth bit of the X Register is Zero, the machine is stopped. If, however, the contents of the B Register was complemented and there was no overflow, $1 \times 2^{-36}$ is added to the contents of the Accumulator.

Example I. (Contents of A Register>Contents of B Register):
Contents of A Register=+010
Contents of B Register=−001 (Transferred in from Memory Address $n$)
Contents of A Register=+010
Contents of B Register=+110 (one's complemented and added)
+ 1 (1×2⁻ⁿ)

Result in Accumulator +001 (TF-3)
Example II. (Contents of A Register<Contents of B Register):
Contents of A Register=+001
Contents of B Register=−010 (Transferred in from Memory Address $n$)
Contents of A Register=+001
Contents of B Register=+101 (One's complemented and added)
+ 1 (1×2⁻ⁿ)

+111 (TF-3)
−000 (TF-4) (change sign and complement)
+ 1 (1×2⁻ⁿ)

−001 (TF-5)

Figure 7:
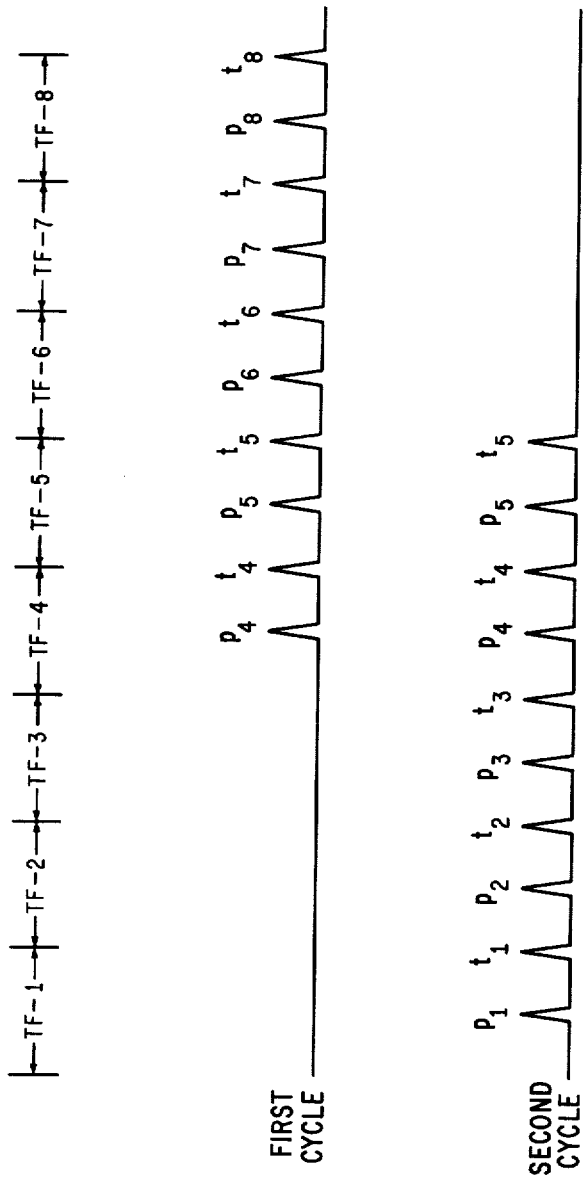
FIG. 7 is a timing diagram of the basic operating cycle of the apparatus under description; and, FIGS. 8–13 are detailed block diagrams of portions of the system of FIG. 1.

Electronic elements, circuits and subsystems may be arranged and connected as shown in FIGS. 8, 9, 10 and 11 and operated, in accordance with the timing diagrams of FIGS. 3 and 7 to accomplish the functions previously described and perform the three stage additions of the preceding examples.

TF-4

Figure 8:
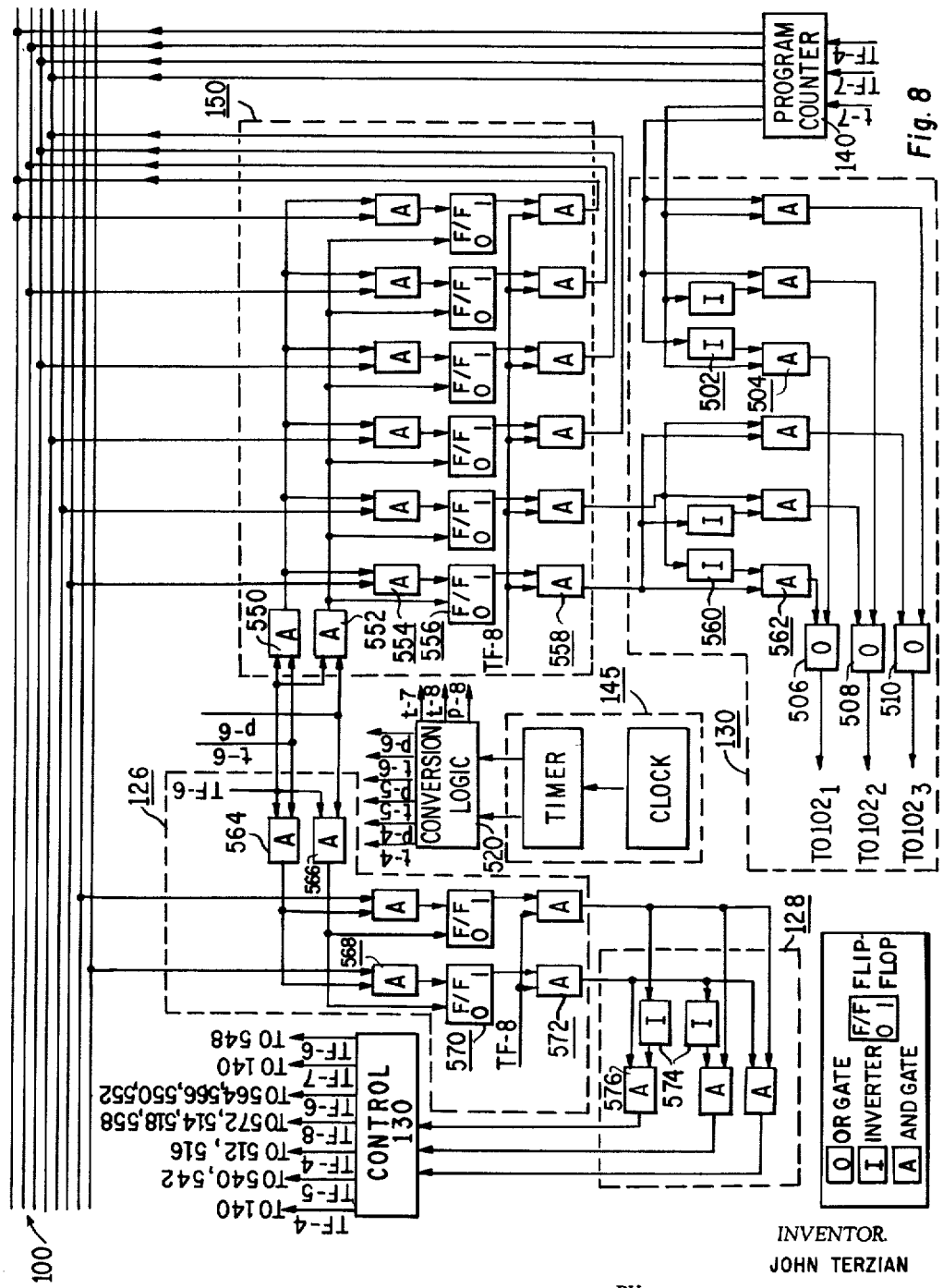
Figure 9:
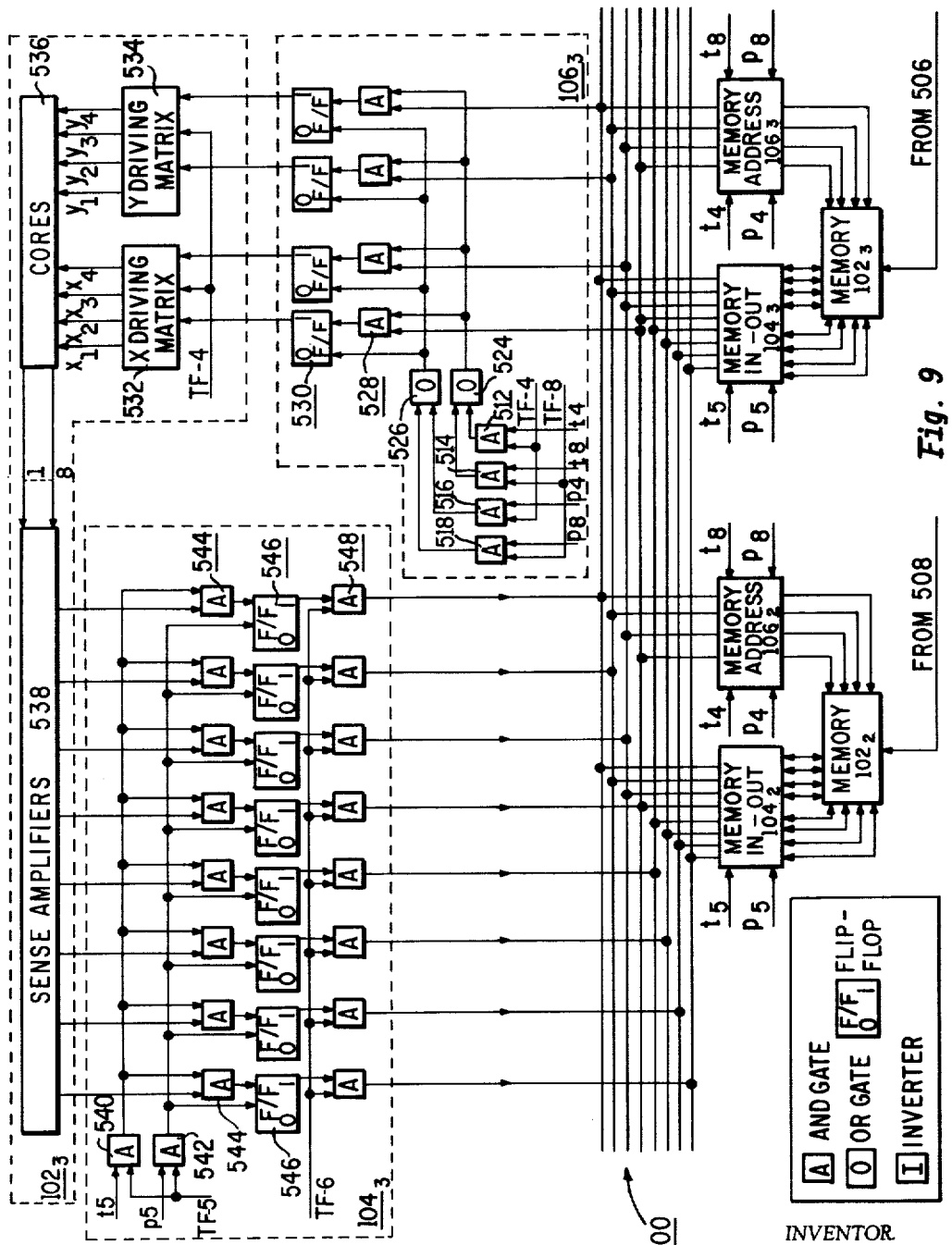

(Refer FIGS. 8, 9)

Control 130 transmits a Transfer-Out level to Program Counter 140. Binary bits 1–4 of the Program Counter 140 which determine the address in memory of the next instruction are thereupon transferred, as explained below, over conductors 1–4 of the Main Transfer Bus 100 to the Memory Address Registers 106. Program Counter binary bits 5–6 are decoded in a matrix comprised of Inverters 502 and AND gates 504 to apply a Read level to the particular Memory $102_1$–$102_3$ desired. The three outputs from this decoder are transferred through OR gates 506, 508, and 510 to their associated memories. A Read level may therefore be transmitted from OR gate 506 to Memory $102_1$, from OR gate 508 to Memory $102_2$, or from OR gate 510 to Memory $102_3$. For the purpose of further explanation, assume that both bits 5 and 6 are "one's" so that Memory $102_3$ is selected via OR gate 510.

Control 130 also transmits a Transfer-In level to each Memory Address Register including Memory Address Register $106_3$. Clock 146 of Timing unit 145 actuates Timer 148, which in turn transmits a $p$ pulse train and a $t$ pulse train to the Conversion Logic Unit 520 which emits individual $p$ and $t$ pulses at the proper times as described above under the heading Timing and shown in FIG. 7. At time $p4$, this unit transfers a pulse to AND gate 516. The coincidence of the Transfer-In level and the $p4$ pulse enables AND gate 516 to transfer a signal through OR gate 526 which resets flip-flops 530. At time $t4$, AND gate 512 is enabled by the coincidence of the $t4$ pulse and the Transfer-In level. This transmits a pulse to AND gates 528, via OR gate 524 to allow the information on channels 1–4 from Program Counter 140 to be transferred through to flip-flop registers 530.

The Read level from Control 130 allows the information in flip-flops 530 to be placed in the X-driving matrix 532 and the Y-driving matrix 534, which are decoders. The appropriate X-line and Y-line are actuated by conventional decoding techniques so that those cores 536, which are designated to be read, transfer their information to Sense Amplifiers 538.

TF-5

Control Unit 130 transmits a Transfer-In pulse to Memory In-Out Registers 104. At time $p5$, the Conversion Logic Unit 520 transmits a pulse to AND gate 542. The coincidence of this pulse and the Transfer-In pulse enables AND gate 542 to clear flip-flops 546. At time $t5$, AND gate 540 is enabled by the coincidence of the $t5$ pulse and the Transfer-In pulse. This transmits a signal to AND gates 544 which enables the transfer of the data content of the individual Sense Amplifiers 538 to flip-flops 546. As explained in the U.S. patent applications referenced, each Memory 102 has a single sense amplifier output from each one of its component planes and consequently one for each digit of the data word and each conductor of Bus 100.

TF-6

Control Unit 130 transmits a Transfer-Out level to Memory In-Out Register $104_3$ and a Transfer-In level to Address Register 150 and Instruction Register 126. The information contained in flip-flops 546 is thus allowed to pass through AND gates 548 to channels 1–8 of the Main Transfer Bus 100.

At time $p6$, a pulse is transmitted from the Conversion Logic Unit 520 to AND gate 552 of Address Register 150. The coincidence of the $p6$ pulse and the Transfer-In level enables AND gate 552 to clear flip-flops 556. At time $t6$, AND gate 550 is enabled by the coincidence of the $t6$ pulse from Conversion Logic Unit 520 and the Transfer-In level to energize AND gates 554. The information on channels 1–6 from Memory In-Out Register $104_3$ is, consequently, sent through AND gates 554 to flip-flops 556.

In like manner, at time $p6$ AND gate 566 is enabled to clear flip-flops 570, and, at time $t6$, AND gate 564 enables AND gates 568 to transfer the information on channels 7, 8 from the Memory In-Out Register $104_3$ to flip-flops 570.

TF-7

Control 130 transmits a signal level and at time $t7$ the Conversion Logic Unit 520 transmits a pulse to Program Counter 140. This coincidence of signals, via an AND gate (not shown) causes Counter 140, by routinely-programmed conventional counter techniques, to increase its count to the next instruction to be performed.

TF-8

Control Unit 130 transmits a Transfer-Out level to Address Register 150 and Instruction Register 126, and a Transfer-In level to Memory Address Registers 106. The information contained in flip-flops 556 is thus transferred out through AND gates 558. The first four bits, which comprise the address of the operand, are sent to channels 1–4 of the Main Transfer Bus 100. Bits 5 and 6 are decoded in a matrix comprised of Inverters 560 and AND gates 562. The outputs of this decoder are transferred through OR gates 560, 508, and 510 to select the desired memory to be energized by a Read signal. Again, assume OR gate 510 causes a Read level to actuate memory $102_3$.

At time $p8$, Converter Logic Unit 520 transfers a pulse to AND gate 518. The coincidence of the $p8$ pulse and the Transfer-In level enables this gate to send a pulse through OR gate 526 to clear flip-flops 530. At time $t8$, the coincidence of the $t8$ pulse and the Transfer-In level enables AND gate 514 and transmits a signal through OR gate 524 to enable AND gates 52 to transfer the information of channels 1–4 from Address Register 150 to flip-flops 530.

The Read level from Control 130 allows the information in flip-flops 530 to be placed in the X-driving matrix 532 and the Y-driving matrix 534. The appropriate X-line and Y-line are thereupon actuated to transfer the data content of the memory location addressed to the Sense Amplifiers 538 therby making the operand available for transfer to the B register.

The information in flip-flops 570 of Instruction Register 126 is transmitted through AND gates 572 to Decoder 128, which is comprised of Inverters 574 and AND gates 576, thus making the instruction available to Control 130.

Figure 10:
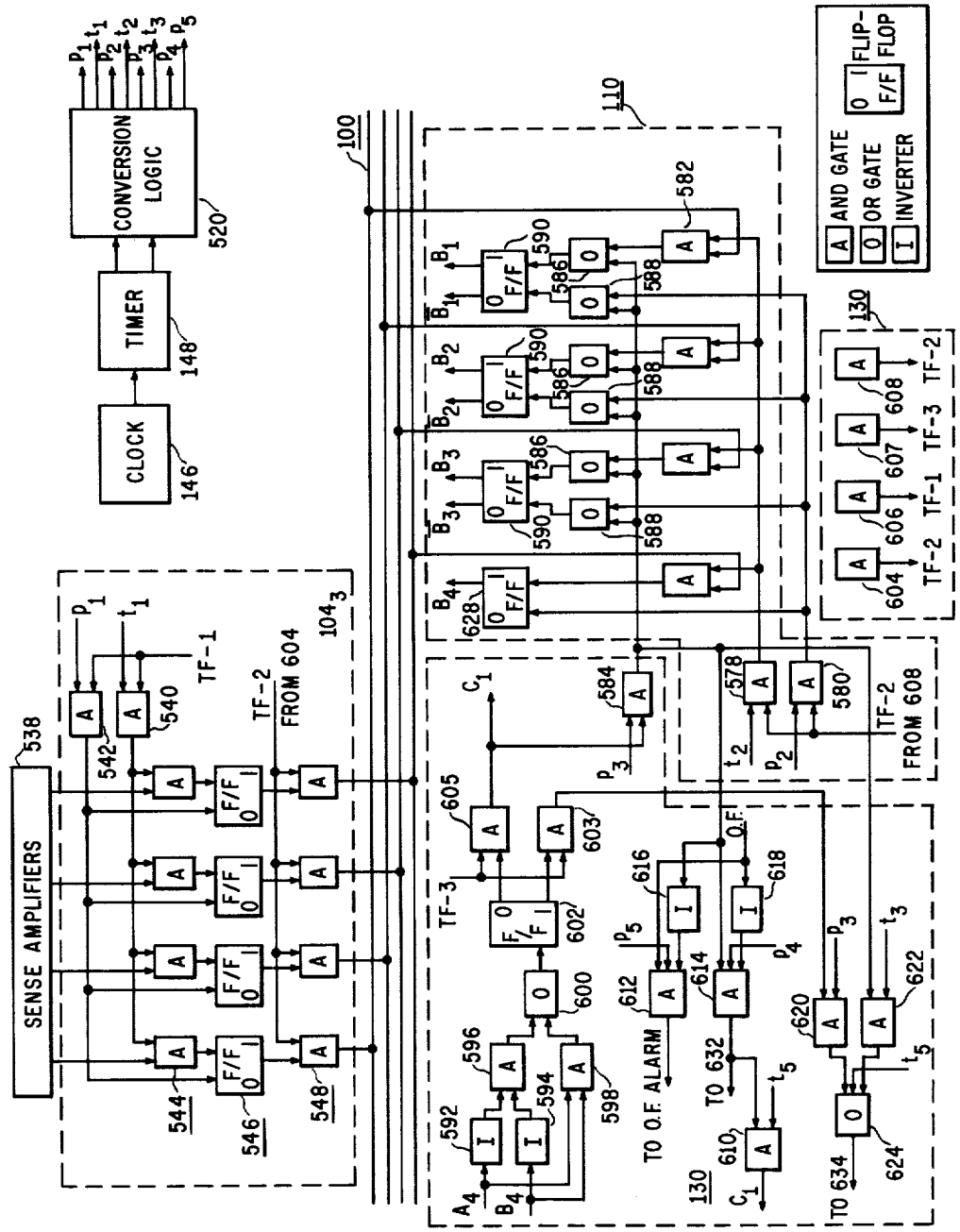
Figure 11:
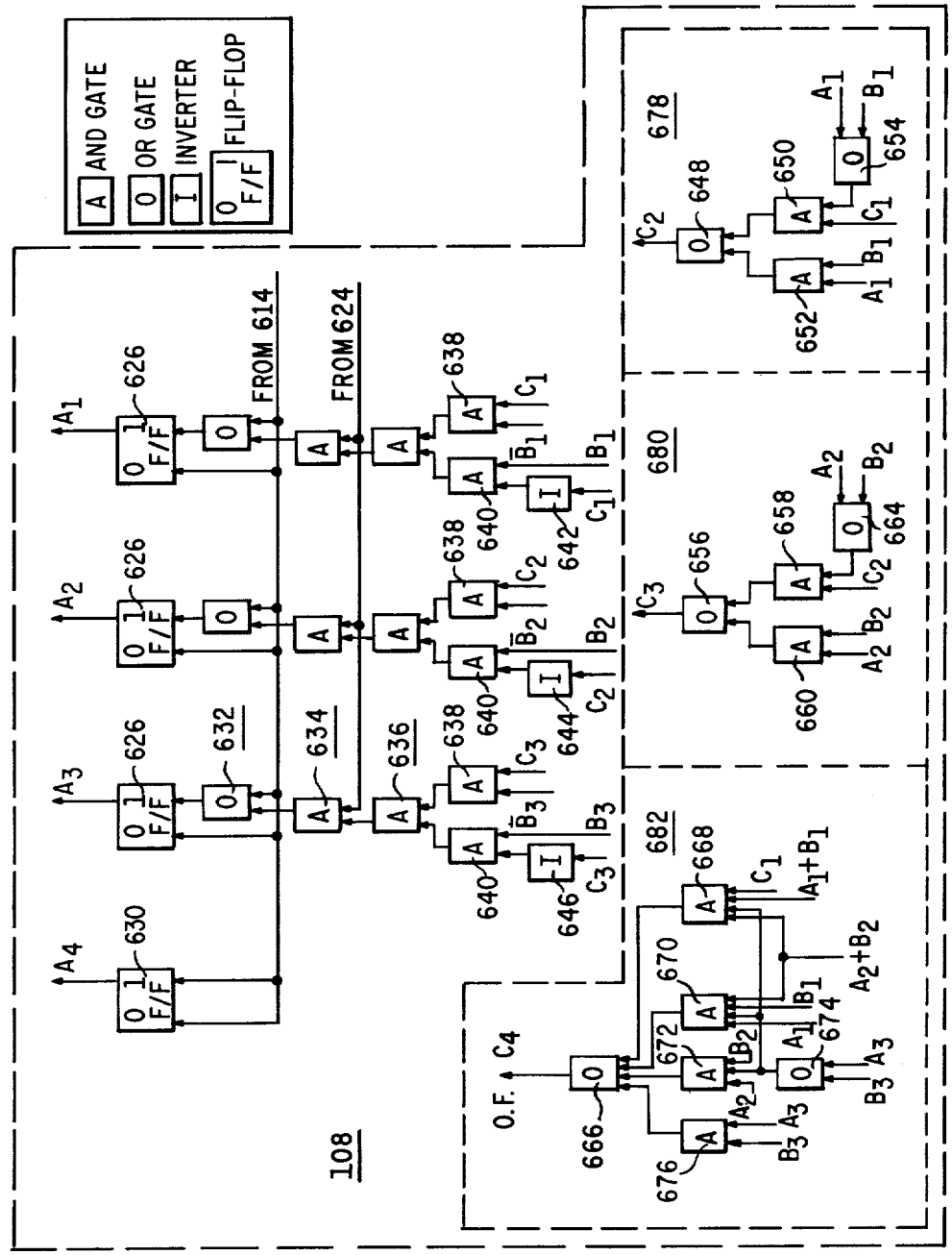

TF-1
(Refer FIGS. 10, 11)

Control 130 transmits a Transfer-In level to Memory In-Out Registers 104. At time $p1$, a pulse is received from the Conversion Logic Unit 520 by AND gate 542. The coincidence of this pulse and the Transfer-In level enables AND gate 542 to clear flip-flops 546. At time $t1$, the coincidence of a pulse from the Conversion Logic Unit 520 and the Transfer-In level enables AND gate 540. This allows AND gates 544 to transfer the information contained in Sense Amplifiers 538 into flip-flops 546. This information is the operand of the instruction to be executed in accordance with the set-up of Control 130 as initiated by the transfer during TF-8 of the instruction portion of hte word to the decoder 128.

TF-2

Control 130 transmits a Transfer-Out level to the Memory In-Out Registers 104 and a Transfer-In level to the B Register 110. The contents of flip-flops 546 then pass through AND gates 548 to channels 1–4 of the Main Transfer Bus 100.

At time $p2$, AND gate 580 is enabled by the coincidence of th $p2$ pulse from the Converter Logic Unit 520 and the Transfer-In level. A signal then passes through OR gates 588 to clear flip-flops 590, and also directly into flip-flop 628 to clear it. At time $t2$, the coincidence of a pulse from Conversion Logic Unit 520 and the Transfer-In level enables AND gate 578 to pulse AND gates 582 and the information on channels 1–4, from the Memory In-Out Register $104_3$, is transferred through AND gates 582, and through OR gates 586 to flip-flops 590 and directly into flip-flop 628.

TF-3

The contents of flip-flop 628, signifying the sign of the word in B Register 110, and the contents of flip-flop 630, signifying the sign of the word in A Register 108, are transferred to a decoder matrix in Control 130 which is comprised of Inverter 592, Inverter 594, AND gate 596, AND gate 598, and OR gate 600. If the signs are equal, a One is set into flip-flop 602 and is sent via AND gate 603 energized by signal level TF-3 to AND gate 620. At time $p3$, the coincidence of this pulse and a pulse from the Conversion Logic Unit 520 enables AND gate 620 and sends an ADD signal through OR gate 624 to AND gates 634 to allow addition.

If the signs are different, the coincidence of a $p3$ pulse from the Converter Logic Unit 520 and a pulse from the Zero side of flip-flop 602, transmitted through AND gate 605 energized by signal level TF-3, enable AND gate 584. A signal is thus transmitted through OR gates 586, 588 to complement flip-flops 590. At time $t3$, a pulse from Conversion Logic Unit 520 and the output of AND gate 584 coincide to enable AND gate 622. An ADD signal is then passed through OR gate 624 to AND gates 634 to allow addi.ion.

Carry

The pulse, which is transmitted from flip-flop 602 of Control 130 when the signs of the A and B Registers differ, is also sent as carry $C_1$ to the least significant, i.e. first, stage of A Register 108, according to the rules for a two's complement, and to AND gate 650.

The carry $C_2$ into the second stage of A Register 108 is provided by unit 678 using common carry logic principles in the following manner. The contents of the first stage of flip-flops 590 and the first stage of flip-flops 626 are passed through OR gate 654 to AND gate 650. The coincidence of the output from OR gate 654 and the carry $C_1$ from Control 130 enables AND gate 650 which passes a signal through OR gate 648 thus providing the carry $C_2$ into the second stage of the A Register 108. This carry may also be generated by AND gate 652 when the contents of the first stage of flip-flops 590 and the first stage of flip-flops 626 coincide at its input. A signal is then passed through OR gate 648 to provide the carry $C_2$.

The carry $C_3$ into the third stage of A Register 108 is provided by unit 680. The contents of the sec nd stage of flip-flops 590 and the second stage of flip-flops 626 are passed through OR gate 664 to AND gate 658 and, if a signal from OR gate 664 coincides with a carry signal $C_2$, AND gate 658 will generate a carry signal $C_3$ via OR gate 656 into the third stage of A Register 108. This carry $C_3$ may also be generated by AND gate 660 transmitting a coincidence of coincident signals from the second stage of flip-flops 590 and the second stage of flip-flops 626 through OR gate 656.

The overflow signal, which would be the carry to the fourth stage for a longer register is provided by matrix 682. It is obtained by implementing logically the following formula for an anticipated carry:

$$C_4 = A_3B_3 + A_2B_2(A_3+B_3) + A_1B_1(A_3+B_3)(A_2+B_2) + C_1(A_3+B_3)(A_2+B_2)(A_1+B_1)$$

This formula shows that there are four ways in which the overflow may be produced as follows. (1) The carry $C_1$ into stage one, the output from OR gate 654, the output from AND gate 664, and the output from OR gate 674 are all inputs to AND gate 668. If they are all in the One condition, this circuit is enabled to pass a signal through OR gate 666 and thus provide the overflow O.F. (2) the output from AND gate 664, the output from the first stage of the B Register 110, the output of the first stage of the A Register 108, and the output of OR gate 674 are all inputs to AND gate 670. If they are all in the One state, this circuit is enabled to pass a signal through OR gate 666 providing an overflow signal. (3) The output of the third stage of the B Register 110 and the third stage of the A Register 108 are passed through OR gate 674 to AND gate 672. The output of the second stage of the B Regiser 110 and the second stage of the A Register 108 are also transferred to this circuit. If all its inputs are in the One condition, AND gate 672 is enabled to pass a signal through OR gate 666 and provide an overflow. (4) If both the third stage of B Register 110 and the third stage of the A Register 108 are in the One stage, AND gate 676 is enabled to pass an overflow signal through OR gate 666.

Addition

The information in the B Register 110 and the carry information is added to the A Register 108. The carry $C_1$ and the information contained in the Zero side of the first stage of the B Register 110 are inputs to AND gate 638 of the first stage of the A Register 108. The carry $C_2$ and the information contained in the Zero side of the second stage of the B Register 110 are inputs to AND gate 638 of the second stage of the A Register 108. The carry $C_3$ and the information contained in the Zero side of the third stage of the B Register 110 are inputs to AND gate 638 of the third stage of the A Register 108. If both inputs to AND gate 638 are in the ONE state, a signal is sent to its corresponding AND gate 636.

The carry $C_1$ inverted by circuit 642 and the information contained in the first stage of the B Register 110 are inputs to AND gate 640 of the first stage of A Register 108. The carry $C_2$ inverted by circuit 644 and the information contained in the second stage of the B Register 110 are inputs to AND gate 640 of the second stage of A Register 108. The carry $C_3$ inverted by circuit 646 and the information contained in the third stage of the B Register 110 are inputs to AND gate 640 of the third stage of A Register 108. If both inputs to AND gate 640 are in the One state, a signal is sent to its corresponding AND gate 636.

If both inputs to each AND gate 636 are active, a signal representing carry and B Register information is transferred to its corresponding AND gate 634. The ADD pulse which is present, via OR gate 624, on the other input to each AND gate 634 enables this information to be passed through to OR gates 632 which in turn set it into flip-flops 626. The contents of the B Register 110 has now been added to the A Register 108 according to conventional practices.

TF-4

If the contents of the B Register 110 was complemented and there was no overflow, the contents of the A Register 108 is one's complemented and its sign reversed. This is essentially performed in AND gate 614 of Control 130. At time $p4$, a pulse is received from the Conversion Logic Unit 520. The two other inputs to this circuit are overflow which was inverted by circuit 618 and the output from AND gate 584 which indicates that the B Register 110 was complemented. Upon the coincidence of its three inputs, AND gate 614 transfers a pulse which travels through OR gates 632 to the set side of flip-flops 626, to the reset side of flip-flops 626, to the set side of flip-flop 630, and to the reset side of flip-flop 630. All stages of A Register 108 accordingly change state.

TF-5

If the contents of B Register 110 was not complemented and there was an overflow, the overflow alarm flip-flop is energized. This is essentially performed in AND gate 612 of Control 130. At time $p5$, a pulse is received from the Logic Conversion Unit 520. The two other inputs to this circuit are overflow and the output of AND gate 584 which has been inverted by circuit 616. Upon the coincidence of its three inputs, AND gate 612 passes a signal to the overflow alarm.

However, if the contents of B Register 110 was complemented and there was no overflow, a One is added to the contents of the A Register 108. This is accomplished in AND gate 610 of Control 130. At time $t5$, a pulse is received from the Conversion Logic Unit. This pulse and the output of AND gate 614, which shows that the B Register 110 was complemented and there was no overflow, enable AND gate 610. A carry $C_1$ is thus provided and is transferred to AND gate 650 to be added to the A Register 108.

Figure 12:
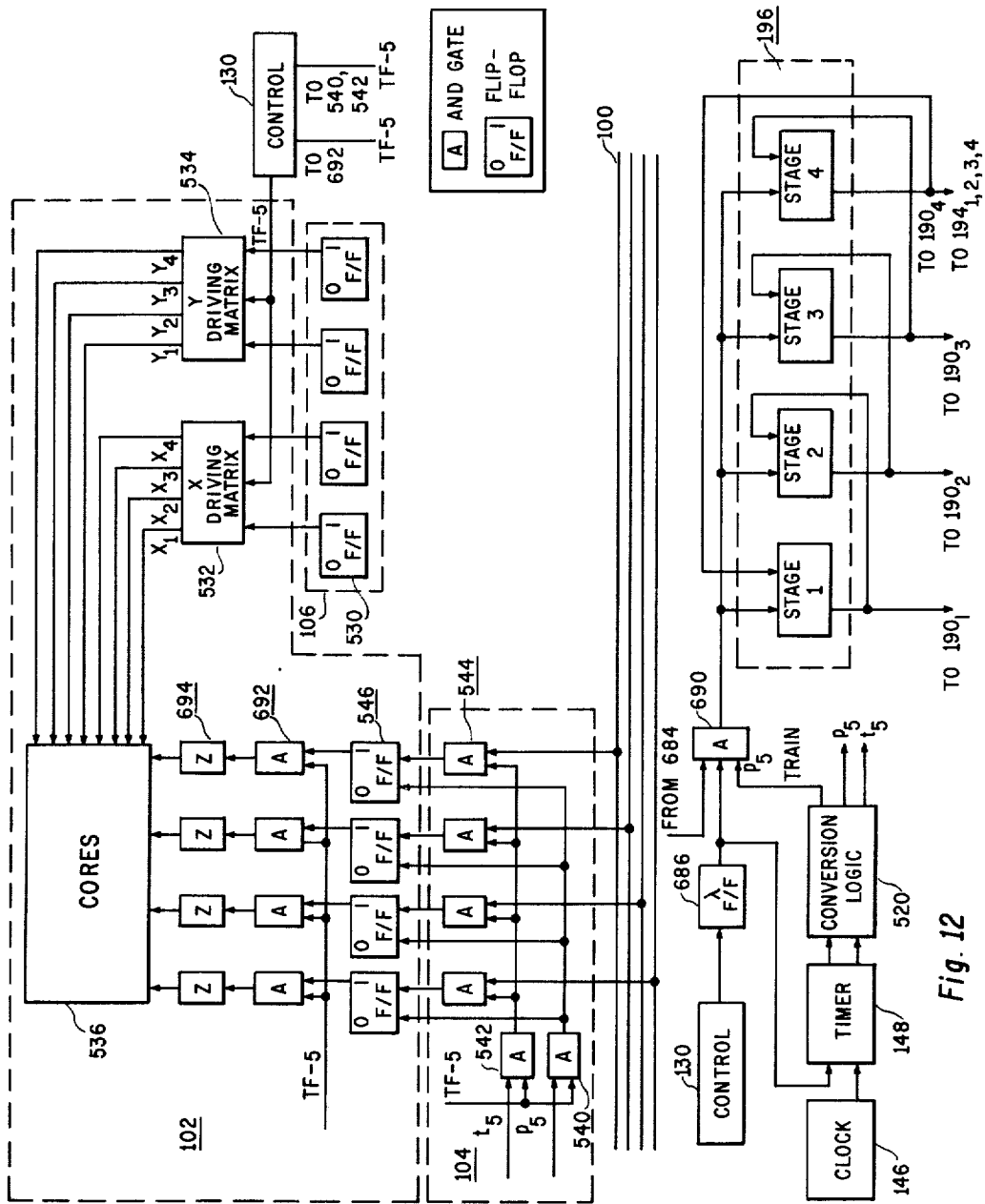
Figure 13:
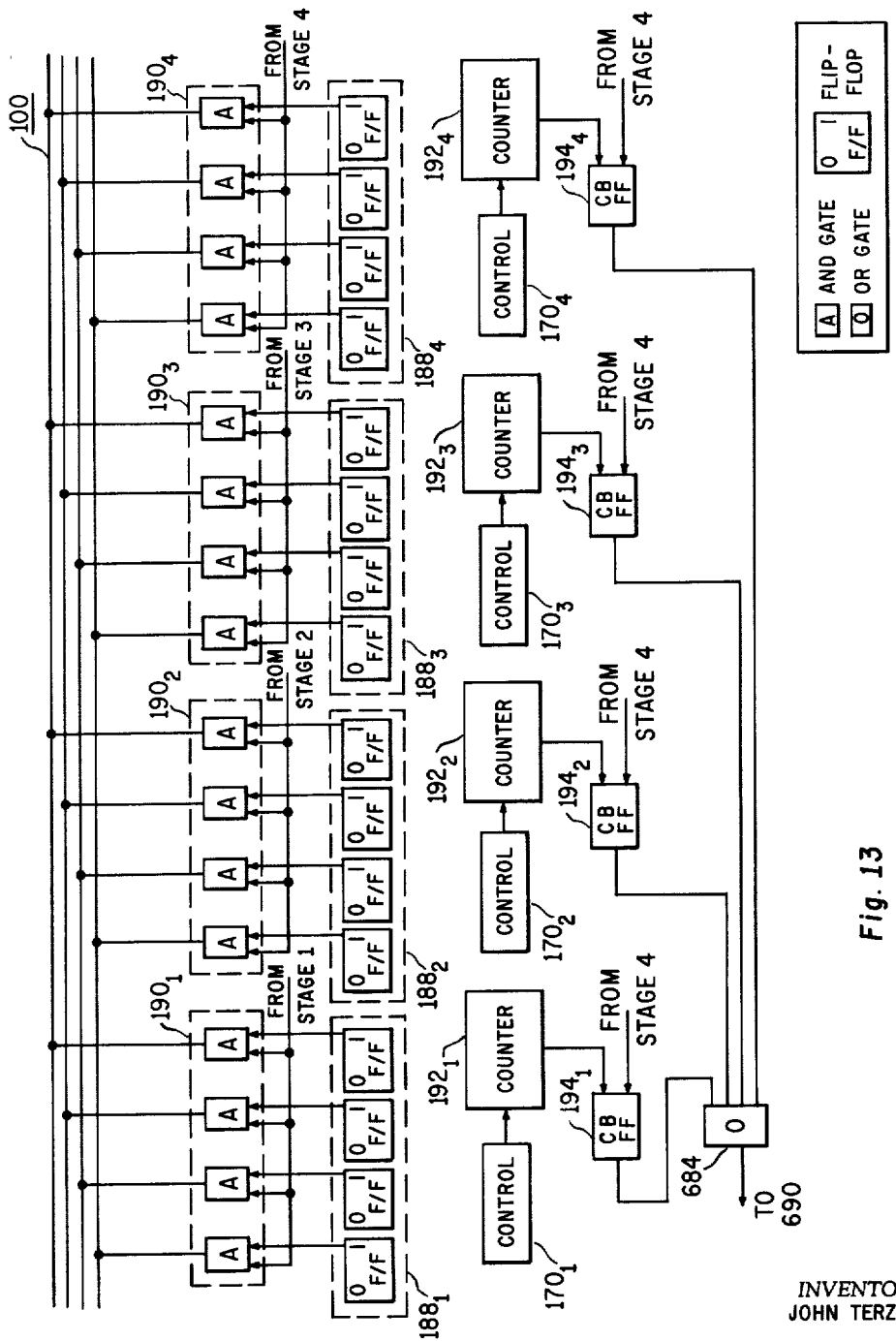

As explained previously, it is possible with the system which has been described, to transfer input-output information over the Main Transfer Bus 100 to Memory 102 during long operations, such as multiplication, while the Arithmetic Unit 190 is being internally operated. For example, such action, as shown in FIGS. 12, 13, may be initiated during TF-5 when, because of the multiplication instruction stored in the Instruction Register, Control 130 sends a signal to set the $\lambda$ flip-flop 686 thus providing an input level to AND gate 690 and to Timer 148. Because of this $\lambda$ signal level the TF-5 level is elongated in Timer 148 as shown at TF-5 in FIG. 3 and described above under the heading Timing. The $p$ signal level train and the $t$ train are transmitted from Timer 148 to Conversion Logic subsystem 520 which as previously explained converts these levels to individual $p$ and $t$ pulses at the various units of the machine including $p5$ pulses which are sent to gate 690 thus allowing the Priority Circuit 196 to be activated, providing that the third input to AND gate 690 indicates that a Buffer $188_n$ is ready to transfer data to memory.

The manner in which information is transferred into Buffers $188_n$ has been described above and in co-pending U.S. patent application Serial No. 755,566, of August 18, 1958. Briefly, as soon as any Buffer $188_n$ is filled with information, Counter $192_n$ under the control of Control Unit $170_n$, which counts input operations until the number which fills the Buffer is achieved, sets its corresponding CB Flip-flop $194_n$. A set CB Flip-flop $194_n$ sends a level through OR gate 634 to AND gate 690 which thereupon, under the conditions described in the paragraph above, emits a series of pulses corresponding to the $p5$ pulse train to the Priority Circuit 196. Assuming that each input device has the same priority, this circuit may be implemented by a ring counter (refer. Millman and Taub, Pulse and Digital Circuits, McGraw-Hill Book Company, Inc., New York, 1956, pp. 343, 344). This type circuit operates so that each succeeding stage emits a pulse in response to each successive pulse of the $p5$ train. For instance, when the first $p5$ pulse arrives at the Priority Circuit 196, a level is emitted by stage 1 which is transferred to AND gates $190_1$ and also to stage 2. This level enables AND gates $190_1$ to send the information contained in Buffer $188_1$ through to channels 1-4 of the Main Transfer Bus 100.

Control Unit 130, throughout TF-5, transmits a Transfer-In from bus level to the Memory In-Out Register 104, a Write level to Memory 102, and a Transfer-In level to Memory 102. At time $p5$, AND gate 542 is enabled by the coincidence of the $p5$ pulse from Conversion Logic Unit 520 and the Transfer-In level thus celaring flip-flops 546. At time $t5$, the coincidence of the $t5$ pulse from the Conversion Logic Unit 520 and the Transfer-In level enables AND gate 540 thus allowing AND gates 544 to transfer the information from channels 1-4 of the Main Transfer Bus 100 into flip-flops 546. The coincidence of the Transfer-In level and the information in flip-flops 546 then enable AND gates 692. If a flip-flop 546 is in the One state, the corresponding Z driver 694 is activated; and, since each Z driver is an inverter, no Z pulse is sent to inhibit a One from being stored in memory by the write pulse. If, however, a Zero is stored in any flip-flop 546, the corresponding Z driver emits a pulse whose value is equal to the X and Y drive pulses but is in the opposite direction thereby preventing the write pulse from switching the core in the corresponding memory position.

The particular Memory 102 and address within that Memory to which data is to be transferred from Buffer Register $188_n$ is determined by the Memory Address Register $106_n$ operated with input signals from the ADC component of the appropriate Input-Output Converter 124 in a manner similar to the operation of the Address Register in the performance of the addition problem described above.

When the second p5 pulse arrives at Priority Circuit 196, stage 2 allows the data in Buffer $188_2$ to be transferred into memory. This same action continues until final Buffer $188_n$ has transferred its information into memory. Whereupon, the output from stage 4 of Priority Circuit 196 resets the CB Flip-flops 194 and further input transfer action is stopped until a CB flip-flop is again set to indicate a Buffer is ready to transfer while the λ flip-flop 686 is in set condition indicating that the Main Bus is available for in-out transfer. As explained above, under the heading Operation of the Input-Output System, this transfer of data between the Input-Output Sysem and the central machine during execution of an arithmetic instruction is an additional feature of the data handling capability of the apparatus under description and is not a substitution for regularly programmed input-output instructions.

The invention has been described as incorporated into a specific computer system. It is, of course, understood that it is not limited to the particular computer or class of equipment described, and may be incorporated into other types of electronic data processing systems.

To prevent undue burdening the description with matter within the ken of those skilled in this art, a block diagram approach has been followed, with a detailed functional description of each block and specific identification of the circuitry it represents. The individual engineer is free to select elements and components such as flip-flop circuits, shift registers, etc. from his own background knowledge or available standard references, such as Arithmetic Operations in Digital Computers, by R. K. Richards (Van Nostrand Publishing Co.); and, Pulse and Digital Circuits, Millman and Taub (McGraw-Hill). Also, a description of the system may be found in an article entitled "System Organization of Mobidic," by John Terzian, in the IRE Wescon Convention Record, Part IV, page 78, which may be considered to be incorporated by reference into this description.

In the following claims the term "unitary" is employed to indicate that each conductor of the bus so defined is integral in the sense that it is not interrupted by intermediate buffers, data processing units, etc. Similarly, the expressions "direct" and "directly" are used in defining the connection of the various subsystems to the central bus to indicate that their data transfer to and from the bus is not through an intermediate subsystem such as the arithmetic unit or the memory but directly through a suitable AND circuit or other data gate.

What is claimed is:

1. Electronic data processing equipment which comprises: a memory system adapted to hold at least one operational program for said machine in the form of a series of binary coded instruction words; an arithmetic unit adapted to perform computation upon binary coded data in accordance with said instructions; a control system adapted to withdraw successive instructions from said memory and dictate the performance of their indicated computations in said arithmetic unit to work said program; and, an input system adapted to transfer data into said memory system, said input system including a buffer register having a program interrupt stage connected to said control system to interrupt its present program and cause it to initiate a new program in accordance with instructions of the present contents of said buffer register and means for introducing a program interrupt signal into said interrupt stage of said register.

2. An electronic computer adapted to process data in the form of a multi-bit binary coded word and comprising: a main transfer bus having a plurality of separate conductors, one corresponding to each bit of said word; a memory system including a plurality of multi-address memory units each connected via memory address and memory in-out registers to said bus; a plurality of internal registers adapted to modify said word and connected directly to said bus; an arithmetic unit including at least one accumulator type register connected directly to said bus and a control circuit connected to said accumulator; a program counter directly connected to said bus; an input-output system connected through at least one buffer register directly to said bus; a program counter storage register connected directly to said bus; an instruction register directly connected to said bus; a control system including an instruction storage device; said control system having an input connection from said instruction register, and output connections independent of said transfer bus to all of said components recited above; a timing system including a basic clock, a timer circuit connected to said clock and providing a series of timing pulses and a series of synchronizing pulses to all of said component systems; and, separate means within each of said component systems for converting said timing and synchronizing pulses to gating pulses.

3. For the processing of data in the form of discrete electrical signals corresponding to the component bits of a data word the combination of: a unitary data transfer bus having a plurality of individual conductors corresponding to the individual bits of said data word; a data word storage subsystem having at least tone data buffer register comprising a plurality of individual signal stages which correspond to the individual component bits of said data word and are individually connected in direct data transfer relationship to corresponding individual ones of said conductors; means for parallel transfer of data between said individual stages and said corresponding individual conductors of said bus; an arithmetic subsystem having at least one data processing register comprising a plurality of individual signal stages which correspond to the individual component bits of said data word and are individually connected in direct data transfer relationship to corresponding individual ones of said conductors; means for parallel transfer of data between said individual stages of said arithmetic register and said corresponding individual conductors of said bus; a data input-output subsystem having at least one data buffer register comprising a plurality of individual signal stages which correspond to the individual component bits of said data word and are individually connected in direct data transfer relationship to corresponding individual ones of said conductors; and, means for parallel transfer of data between said individual stages of said input-output register and said corresponding individual conductors of said bus.

4. An electronic data processing system comprising: a unitary data transfer bus having a plurality of individual component conductors each corresponding to a separate component digit of a data word; a memory system having a data buffer register with a plurality of component stages each connected in direct data transfer relationship to one of said individual conductors; a plurality of additional data registers each having a plurality of individual data stages similarly connected each in direct data transfer relationship to a corresponding one of said individual conductors; an input-output subsystem having a data buffer register with a plurality of component stages each connected in direct data transfer relationship to one of said individual conductors; a control subsystem including a plurality of electronic switches connected to said register stage to bus conductor connections and arranged to control the flow of data signals between said stages and said conductors; a source of system-synchronizing timing pulses connected to said switches of said control system to synchronize said transfer of data; and, means for controlling the transfer of data from said input-output subsystem to said data transfer bus including a multi-stage shift register, means for inserting data into some stages only of said register in a first data input operation, means for shifting said inserted data within said shift register and inserting additional data in succeeding data input operations, and means for effecting said transfer from said input-output subsystem to said data transfer bus in response to said shifting operations.

5. The invention according to claim 4 wherein a counter circuit is provided to count said shifting operations and means operated by said counter circuit controls said means for effecting said transfer from said input-output subsystem.

6. The invention according to claim 4 including means for inserting a control bit signal into a stage of said shift register in advance of a series of said shifting operations; means for shifting said control bit through a series of stages in response to said shifting operations; and, means for effecting said transfer from said input-output subsystem when said control bit signal has been shifted into a given stage.

7. An electronic data processing system comprising: a unitary data transfer bus having a plurality of individual component conductors each corresponding to a separate component digit of a data word; a memory system having a data register with a plurality of component stages each connected in direct data transfer relationship to one of said individual conductors; a plurality of additional data registers each having a plurality of individual data stages similarly connected each in direct data transfer relationship to a corresponding one of said individual conductors; a plurality of input-output subsystems each having a data register with a plurality of component stages which are connected in direct data transfer relationship to a corresponding one of said individual conductors; a control subsystem including a plurality of electronic switches connected to said register stage to bus conductor connections and arranged to control the flow of data signals between said stages and said conductors; a source of system-synchronizing timing pulses connected to said switches of said control system to synchronize said transfer of data; and, means for controlling the transfer of data from said input-output subsystems to said data transfer bus, which includes in each of said input-output subsystems a multi-stage shift register, means for inserting data into some stages only of said register in a first data input operation, means for shifting said inserted data within said shift register and inserting additional data in succeeding data input operations, and means for effecting said transfer from said input-output subsystem to said data transfer bus in response to said shifting operations.

8. The invention according to claim 7 wherein each of said input-output subsystems includes a bistable signal device responsive to the operation of shifting data within its respective shift register and means connected to said signal device for controlling said means for effecting transfer.

9. The invention according to claim 8 wherein a common priority circuit is connected to a plurality of said bistable signal devices, said priority circuit comprising means for individually sensing the stable state of each of said devices in accordance with a given cycle and actuating its respective means for effecting transfer in response to a given stable state of each device as it is sensed.

10. Electronic data processing apparatus of the type which operates in accordance with a program of successive instructions represented by binary coded instruction words each having an address portion and an instruction portion, to process data in the form of binary coded operand words and comprising: a unitary data transfer bus having a plurality of individual conductors corresponding to the component bits of said binary coded words; a memory system having a plurality of independently addressable binary data word storage locations and at least one data buffer register selectively connectable to desired ones of said locations and having a plurality of individual stages each corresponding to a component bit of a data word and each having a direct data transfer connection to a corresponding conductor of said data bus; an arithmetic subsystem having at least two multi-stage data processing registers each having a plurality of individual stages each corresponding to a component bit of a data word and each having a direct data transfer connection to a corresponding conductor of said data bus; a plurality of data registers each having a plurality of individual stages corresponding to those bits which comprise said address portion of said instruction word and a direct data transfer connection to a corresponding conductor of said transfer bus; an instruction register having a plurality of individual stages corresponding to those bits which comprise said instruction portion of said instruction word and a direct data transfer connection to a corresponding conductor of said transfer bus; a decoder subsystem including a data storage register having a plurality of individual stages each corresponding to a different one of those bits which comprise said instruction portion of said instruction word and each having a direct data transfer connection to a corresponding stage in said instruction register; a timing subsystem including means for generating a cyclic sequence of timing pulses and for conducting said pulses to said various data transfer connections; and, a control system including a plurality of control connections between said decoder data storage register and said various data transfer connections and arranged, in conjunction with said timing system, to effect the transfer of the contents of a memory location containing a first instruction word via said memory buffer register and said transfer bus to said instruction register and one of said plurality of data registers with the bits of said first instruction word corresponding to a machine instruction being transferred to said instruction register and the bits corresponding to the address portion of said word being transferred to said one register, to effect the transfer of the contents of the memory location indicated by the address data in said one register as an operand word via said buffer register and said transfer bus to one of said data processing registers in said arithmetic subsystem, to effect the transfer of the contents of said instruction register to said data storage register of said decoder subsystem, to effect the hold of said instruction portion of said first instruction word in said data storage register of said decoder while the data content of said arithmetic subsystem is processed in accordance with the instruction thus stored in said decoder while a second instruction word is transferred from a memory location to said instruction register and said one register as above thereby providing an overlap of the execution cycle of one word with the instruction and operand accesses to memory of another.

11. Electronic data processing apparatus comprising: a unitary data transfer bus having a plurality of individual conductors corresponding to the individual component bits of a data processing word; a memory subsystem having a multi-stage data buffer register with direct data transfer connections between each one of its component stages and a corresponding one of said individual conductors; an arithmetic subsystem having at least one multi-stage data processing register with direct data transfer connections between each one of its component stages and a corresponding one of said individual conductors; a plurality of multi-stage data registers each having direct data transfer connections between each one of its component stages and a corresponding one of said individual conductors; an input-output subsystem having at least one multi-stage buffer register with a direct data transfer connection between each of its component stages and a corresponding one of said individual conductors; a data transfer control subsystem connected to said data transfer connections to effect data transfer in accordance with a programmed routine; said control subsystem including means for providing a cyclic repetition of a given number of signal levels of a given duration and means for providing a given sequence of signal pulses within the time period of said given durations, whereby a given number of said signal levels of a given duration define a basic operating cycle of said apparatus, each of said levels defines a step within a cycle and said pulses each define an operation within a step.

12. The invention according to claim 11 wherein means is provided to extend the time duration of selected ones of said signal levels so that it will include the time interval of additional ones of said signal pulses, thereby increasing the number of operations within a given step without requiring repetition of the other steps of the basic cycle.

References Cited in the file of this patent

UNITED STATES PATENTS

| | | |
|---|---|---|
| 2,604,262 | Phelps et al. | July 22, 1952 |
| 2,658,681 | Palmer et al. | Nov. 10, 1953 |
| 2,667,533 | Zenner | Jan. 26, 1954 |
| 2,778,006 | Guterman | June 15, 1957 |
| 2,799,449 | Turing et al. | July 16, 1957 |
| 2,800,277 | Williams et al. | July 23, 1957 |